(12) United States Patent
Youn et al.

(10) Patent No.: US 11,350,475 B2
(45) Date of Patent: *May 31, 2022

(54) METHOD AND WIRELESS DEVICE FOR HANDLING PDU SESSION IN 5G MOBILE COMMUNICATION

(71) Applicant: LG Electronics Inc., Seoul (KR)

(72) Inventors: Myungjune Youn, Seoul (KR); Laeyoung Kim, Seoul (KR); Jaehyun Kim, Seoul (KR); Hyunsook Kim, Seoul (KR); Sangmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 9 days.

This patent is subject to a terminal disclaimer.

(21) Appl. No.: 16/926,185

(22) Filed: Jul. 10, 2020

(65) Prior Publication Data

US 2020/0344831 A1 Oct. 29, 2020

Related U.S. Application Data

(63) Continuation of application No. 16/573,996, filed on Sep. 17, 2019, now Pat. No. 10,743,361.

(30) Foreign Application Priority Data

Sep. 17, 2018 (KR) .................. 10-2018-0110959
Oct. 8, 2018 (KR) .................. 10-2018-0119717

(51) Int. Cl.
*H04W 76/16* (2018.01)
*H04W 76/30* (2018.01)
(Continued)

(52) U.S. Cl.
CPC ........... *H04W 76/16* (2018.02); *H04W 76/20* (2018.02); *H04W 76/30* (2018.02); *H04W 80/02* (2013.01)

(58) Field of Classification Search
None
See application file for complete search history.

(56) References Cited

U.S. PATENT DOCUMENTS

| 8,494,529 | B2 | 7/2013 | Kim et al. |
| 10,485,050 | B2 | 11/2019 | Chinthalapudi et al. |

(Continued)

FOREIGN PATENT DOCUMENTS

WO 2017142362 8/2017

OTHER PUBLICATIONS

3rd Generation Partnership Project; Technical Specification Group Services and System Aspects; "General Packet Radio Service (GPRS) enhancements for Evolved Universal Terrestrial Radio Access Network (E-UTRAN) access (Release 14)," 3GPP TS 23.401 V14.8.0, Jun. 2018, 393 pages.
3rd Generation Partnership Project; Technical Specification Group Services and System Aspects; "Architecture enhancements for non-3GPP accesses (Release 14)," 3GPP TS 23.402 V14.7.0, Mar. 2018, 309 pages.

(Continued)

*Primary Examiner* — Steve R Young
(74) *Attorney, Agent, or Firm* — Fish & Richardson P.C.

(57) ABSTRACT

Systems and techniques for handling a protocol data unit (PDU) session by a wireless device implementing an access stratum (AS) layer and a non-access stratum (NAS) layer in a wireless communication system. An example technique includes determining, by the AS layer of the wireless device, whether a user plane for the PDU session is activated or released; transferring, by the AS layer and to the NAS layer of the wireless device based on a determination that the user plane for the PDU session is activated, first information indicating that the user plane for the PDU session is activated; and transferring, by the AS layer and to the NAS layer of the wireless device based on a determination that the user plane for the PDU session is released, second information indicating that the user plane for the PDU session is released.

17 Claims, 20 Drawing Sheets

(51) Int. Cl.
*H04W 76/20* (2018.01)
*H04W 80/02* (2009.01)

(56) References Cited

U.S. PATENT DOCUMENTS

| | | | |
|---|---|---|---|
| 2013/0039339 A1* | 2/2013 | Rayavarapu | H04W 76/19 370/331 |
| 2018/0324577 A1 | 11/2018 | Faccin et al. | |
| 2019/0037636 A1 | 1/2019 | Kim et al. | |
| 2019/0074449 A1 | 3/2019 | Chen et al. | |
| 2019/0075482 A1 | 3/2019 | Eriksson et al. | |
| 2019/0090164 A1* | 3/2019 | Ding | H04W 76/11 |
| 2019/0174449 A1* | 6/2019 | Shan | H04W 60/00 |
| 2019/0335413 A1* | 10/2019 | Kawasaki | H04W 76/25 |
| 2020/0059989 A1* | 2/2020 | Velev | H04W 8/08 |

OTHER PUBLICATIONS

Intel Corporation, "5G access control mechanism in IDLE and INACTIVE," R2-1802939, 3GPP TSG RAN WG2 Meeting #101, Athens, Greece, dated Feb. 26-Mar. 2, 2018, 6 pages.

Intel Corporation, "Supporting Next Gen QoS in NR," R2-169070, 3GPP TSG-RAN WG2 Meeting #96, Reno, USA, dated Nov. 14-18, 2016, 12 pages.

Samsung, "PDU Session User Plane protocol," R3-181017, 3GPP TSG-RAN WG3 #99 meeting, Athens, Greece, dated Feb. 26-Mar. 2, 2018, 12 pages.

Sharp, "[J020] issue on missing indication to stop the NAS timer T3540," R2-1812945, 3GPP TSG-RAN WG2 Meeting #103, Gothenburg, Sweden, dated Aug. 20-24, 2018, 6 pages.

* cited by examiner

METHOD AND WIRELESS DEVICE FOR HANDLING PDU SESSION IN 5G MOBILE COMMUNICATION

CROSS-REFERENCE TO RELATED APPLICATIONS

This application is a continuation of U.S. application Ser. No. 16/573,996, filed on Sep. 17, 2019, which claims the benefit pursuant to 35 U.S.C. § 119 (e) of Korean Patent Applications No. 10-2018-0110959, filed on Sep. 17, 2018, and 10-2018-0119717, filed on Oct. 8, 2018, the contents of which are all hereby incorporated by reference herein in their entirety.

TECHNICAL FIELD

The present disclosure generally relates to mobile communications, and in particular to next-generation mobile communication, for example, 5G standard-related mobile communication.

BACKGROUND

In 3GPP technical standards for mobile communication systems, in order to support $4^{th}$-generation communication as well as related forums and new technologies, research on Long Term Evolution/System Architecture Evolution (LTE/SAE) technology has aimed to improve the performance of 3GPP technologies.

SUMMARY

One general aspect of the present disclosure includes a method of handling a protocol data unit (PDU) session in a wireless communication system, the method performed by a wireless device implementing an access stratum (AS) layer and a non-access stratum (NAS) layer and including: determining, by the AS layer of the wireless device, whether a user plane for the PDU session is activated or released. The method of handling also includes transferring, by the AS layer and to the NAS layer of the wireless device based on a determination that the user plane for the PDU session is activated, first information indicating that the user plane for the PDU session is activated. The method of handling also includes transferring, by the AS layer and to the NAS layer of the wireless device based on a determination that the user plane for the PDU session is released, second information indicating that the user plane for the PDU session is released. Other embodiments of this aspect include corresponding computer systems, apparatus, and computer programs recorded on one or more computer storage devices, each configured to perform the actions of the methods.

Implementations may include one or more of the following features. The method further including: storing, by the NAS layer of the wireless device, information related to a deactivated status of the PDU session. The method further including: determining that the PDU session is in a deactivated status, based on (i) the NAS layer receiving the second information from the AS layer, and (ii) the NAS layer not receiving a PDU session release message from a network. The method further including: determining that the PDU session is not deactivated and that the PDU session is released, based on (i) the NAS layer receiving the second information from the AS layer, and (ii) the NAS layer receiving a PDU session release message from a network. The method further including: transmitting, by the NAS layer of the wireless device, a first NAS message related to the PDU session. The method may also include receiving, by the NAS layer of the wireless device, a second NAS message related to the PDU session. The method may also include where the first NAS message includes a PDU session establishment request message. The method may also include where the second NAS message includes a PDU session establishment accept message or a PDU session establishment reject message. The method further including: determining that the PDU session is in a deactivated status, based on (i) the NAS layer receiving a PDU session establishment accept message, and (ii) the NAS layer not receiving the first information from the AS layer. Implementations of the described techniques may include hardware, a method or process, or computer software on a computer-accessible medium.

Another general aspect of the present disclosure includes a wireless device configured to handle a protocol data unit (PDU) session in a wireless communication system, the wireless device configured to implement an access stratum (AS) layer and a non-access stratum (NAS) layer, and including: a transceiver; at least one processor; and at least one computer memory operably connectable to the at least one processor and storing instructions that, when executed by the at least one processor, perform operations that include: determining, by the AS layer of the wireless device, whether a user plane for the PDU session is activated or released. The operations also include transferring, by the AS layer and to the NAS layer of the wireless device based on a determination that the user plane for the PDU session is activated, first information indicating that the user plane for the PDU session is activated. The operations also include transferring, by the AS layer and to the NAS layer of the wireless device based on a determination that the user plane for the PDU session is released, second information indicating that the user plane for the PDU session is released. Other embodiments of this aspect include corresponding computer systems, apparatus, and computer programs recorded on one or more computer storage devices, each configured to perform the actions of the methods.

Implementations may include one or more of the following features. The wireless device where the operations further include: storing, by the NAS layer, information related to a deactivated status of the PDU session. The wireless device where the operations further include: determining that the PDU session is in a deactivated status, based on (i) the NAS layer receiving the second information from the AS layer, and (ii) the NAS layer not receiving a PDU session release message from a network. The wireless device where the operations further include: determining that the PDU session is not deactivated and that the PDU session is released, based on (i) the NAS layer receiving the second information from the AS layer, and (ii) the NAS layer receiving a PDU session release message from a network. The wireless device where the operations further include: transmitting, by the NAS layer, a first NAS message related to the PDU session. The operations may also include receiving, by the NAS layer, a second NAS message related to the PDU session. The wireless device where the first NAS message includes a PDU session establishment request message. The wireless device where the second NAS message includes a PDU session establishment accept message or a PDU session establishment reject message. The wireless device where the operations further include: determining that the PDU session is in a deactivated status, based on (i) the NAS layer receiving a PDU session establishment accept message, and (ii) the NAS layer not receiving the first information from the AS layer. Implementations of the described techniques may include hardware, a method or process, or computer software on a computer-accessible medium.

Another general aspect includes a wireless device configured to handle a protocol data unit (PDU) session in a wireless communication system, the wireless device configured to implement an access stratum (AS) layer and a non-access stratum (NAS) layer, the wireless device including: a display; an input unit; a transceiver; at least one processor; and at least one computer memory operably connectable to the at least one processor and storing instructions that, when executed by the at least one processor, perform operations including: determining, by the AS layer of the wireless device, whether a user plane for the PDU session is activated or released. The operations also include transferring, by the AS layer and to the NAS layer of the wireless device based on a determination that the user plane for the PDU session is activated, first information indicating that the user plane for the PDU session is activated. The wireless device also includes transferring, by the AS layer and to the NAS layer of the wireless device based on a determination that the user plane for the PDU session is released, second information indicating that the user plane for the PDU session is released. Other embodiments of this aspect include corresponding computer systems, apparatus, and computer programs recorded on one or more computer storage devices, each configured to perform the actions of the methods.

Implementations may include one or more of the following features. The wireless device where the operations further include: storing, by the NAS layer, information related to a deactivated status of the PDU session.

Implementations of the described techniques may include hardware, a method or process, or computer software on a computer-accessible medium. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

DETAILED DESCRIPTION

Research in Architecture Evolution (AE) has been performed based on 3GPP SA WG2 regarding network technology that aims to determine the structure of a network and to support mobility between heterogeneous networks, in line with an LTE task of a 3GPP TSG RAN. Research in SAE has aimed at developing a 3GPP system into a system that supports various radio access technologies based on an Internet Protocol (IP), and has been carried out for the purpose of an optimized packet-based system which minimizes transmission delay with improved data transmission capability.

An Evolved Packet System (EPS) higher level reference model defined in 3GPP SA WG2 includes a non-roaming case and roaming cases having various scenarios, and examples of details can be found in 3GPP technical standard documents TS 23.401 and TS 23.402. An example of a network configuration is shown in FIG. 1, which has been reconfigured from the EPS higher level reference model.

Figure 1:
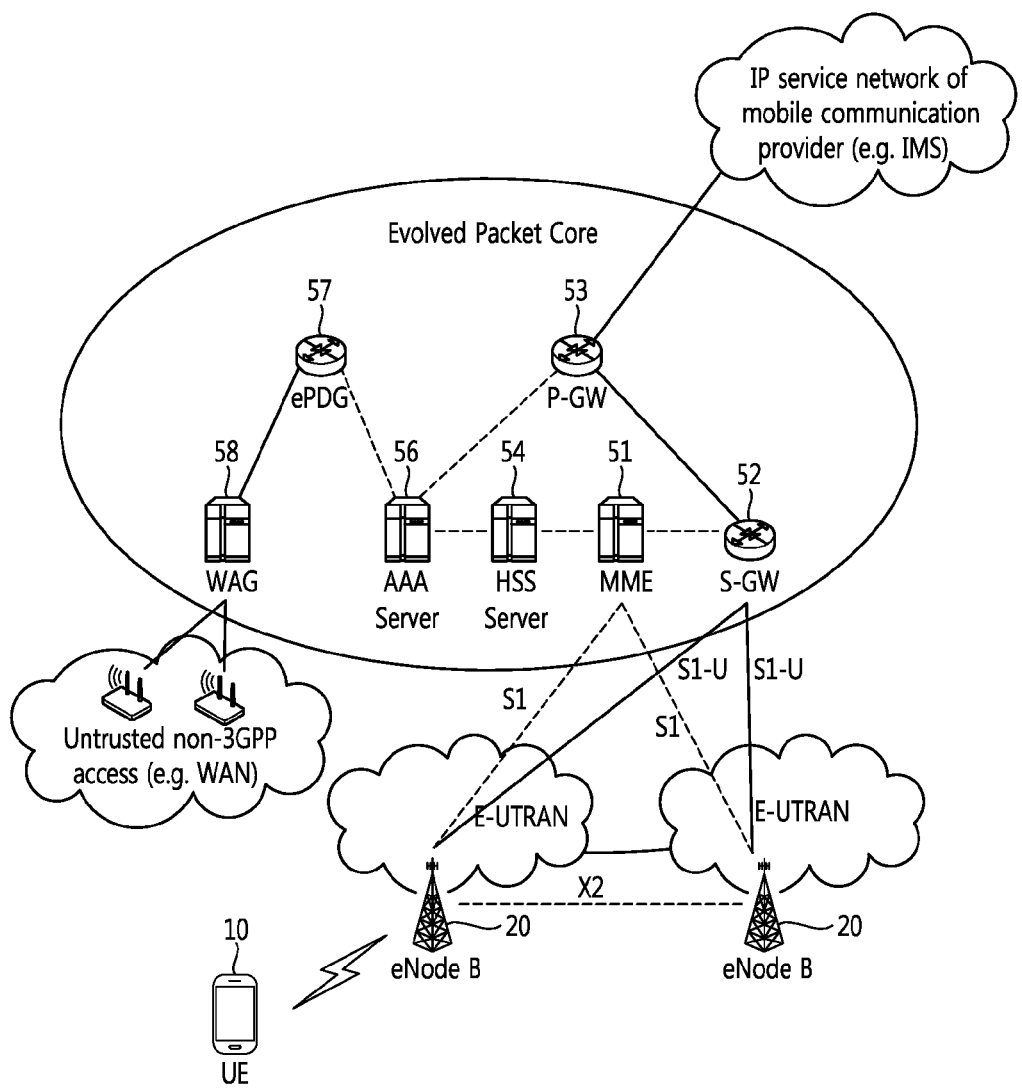
FIG. 1 shows an example of a configuration of an evolved mobile communication network.

FIG. 1 shows an example of a configuration of an evolved mobile communication network.

An Evolved Packet Core (EPC) may include various elements. The example in FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 performs a role of a local mobility anchor point. That is, for mobility within an E-UTRAN (e.g., a Universal Mobile Telecommunications System (Evolved-UMTS) Terrestrial Radio Access Network defined after 3GPP release-8), packets can be routed through the S-GW 52. Furthermore, the S-GW 52 may perform a role of an anchor point for mobility with another 3GPP network (e.g., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can perform a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG performs a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (e.g., an operator), via various elements within an EPC based on non-3GPP access as well as based on 3GPP access.

Furthermore, FIG. 1 shows various reference points (e.g., S1-U and S1-MME). In a 3GPP system, a link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MIME |

TABLE 1-continued

| REFERENCE POINT | DESCRIPTION |
| --- | --- |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

<Next-Generation Mobile Communication Network>

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

The 5G mobile communication defined in the international telecommunication union (ITU) provides a data transfer rate of up to 20 Gbps and a sensible transfer rate of at least 100 Mbps anytime anywhere. 'IMT-2020' is a formal name, and aims to be commercialized in the year 2020 worldwide.

The ITU proposes three usage scenarios, e.g., an eMBB (enhanced Mobile BroadBand), mMTC (massive Machine Type Communication), and URLLC (Ultra Reliable and Low Latency Communications).

First, the URLLC relates to a usage scenario which requires a high reliability and a low latency. For example, a service such as autonomous driving, factory automation, and augmented reality requires a high reliability and a low latency (e.g., a latency less than or equal to 1 ms). At present, a latency of 4G (LTE) is statistically 21-43 ms (best 10%), 33-75 ms (median). This is insufficient to support a service requiring the latency less than or equal to 1 ms.

Next, an eMBB usage scenario relates to a usage scenario requiring a mobile ultra-wide band.

It seems that a core network designed for the existing LTE/LTE-A has difficulty in accommodating a high-speed service of the ultra-wide band.

Therefore, there is a need to re-design the core network in 5G mobile communication.

Figure 2:
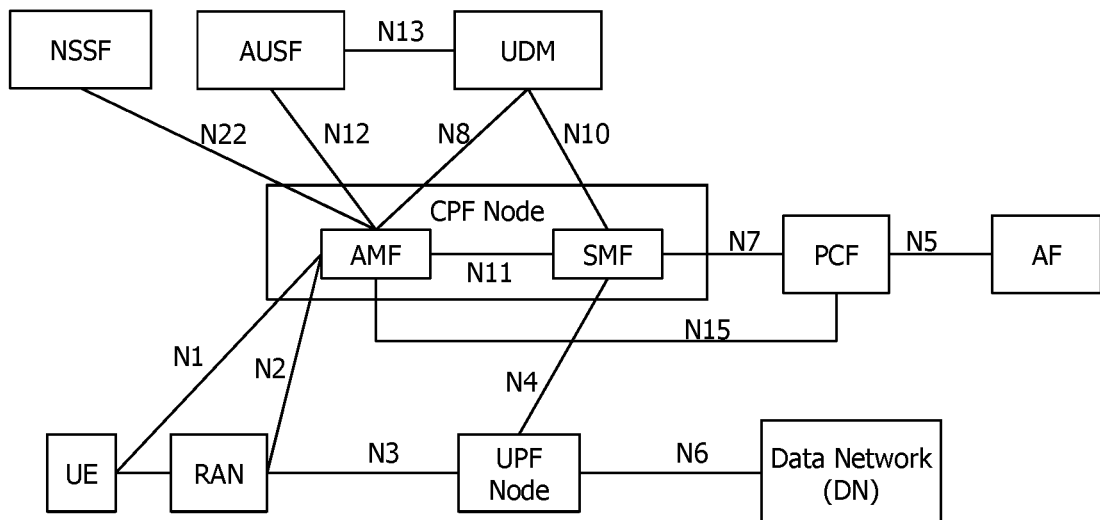
FIG. 2 shows an example of a structure of next-generation mobile communication from a perspective of a node.

FIG. 2 shows an example of a structure of next-generation mobile communication from a perspective of a node.

As can be seen with reference to FIG. 2, a UE is coupled to a data network (DN) via a next generation radio access network (RAN).

The illustrated control plane function (CPF) node performs the entirety or part of a mobility management entity (MME) function of 4G mobile communication and the entirety or part of a control plane function of an S-serving gateway (SG) and PDN gateway (P-GW). The CPF node includes an access and mobility management function (AMF) and a session management function (SMF).

The illustrated user plane function (UPF) node is a type of a gateway through which user data is transmitted/received. The UPF node may perform the entirety or part of a user plane function of an S-GW or P-GW of 4G mobile communication.

The illustrated policy control function (PCF) is a node which controls a provider's policy.

The illustrated application function (AF) is a server for providing several services to the UE.

The illustrated unified data management (UDM) is a type of a server which manages subscriber information, such as a home subscriber server (HSS) of 4G mobile communication. The UDM stores the subscriber information in a unified data repository (UDR) and manages it.

The illustrated authentication server function (AUSF) authenticates and manages the UE.

The illustrated network slice selection function (NSSF) is a node for network slicing as described below.

According to some implementations of FIG. 2, the UE can simultaneously access two data networks by using multiple protocol data unit or packet data unit (PDU) sessions.

Figure 3:
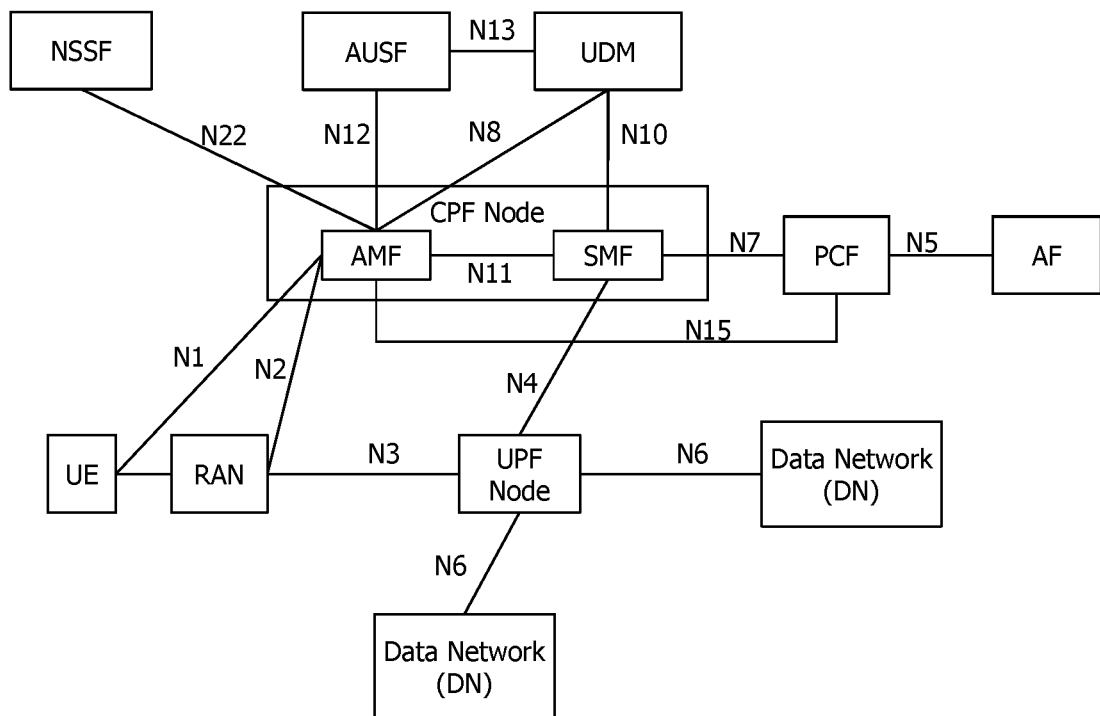
FIG. 3 shows an example of an architecture for supporting simultaneous accesses to two data networks.

FIG. 3 shows an example of an architecture for supporting simultaneous accesses to two data networks.

In the architecture shown in FIG. 3, a UE uses one PDU session to simultaneously access the two data networks.

Figure 4:
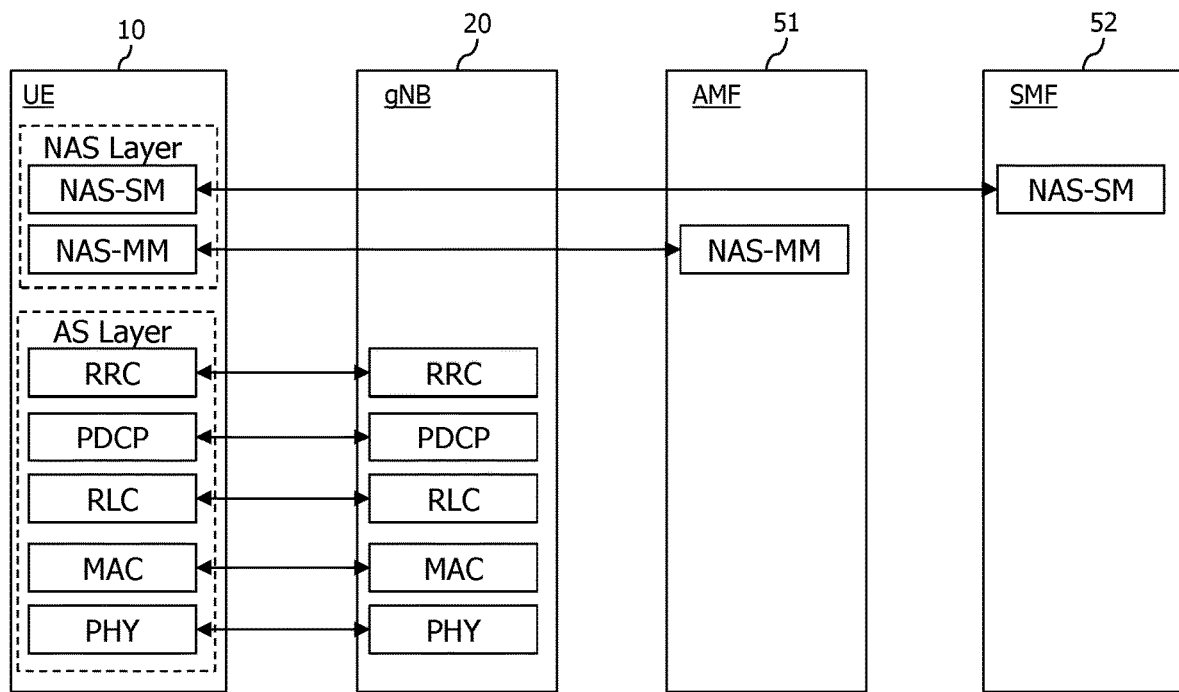
FIG. 4 shows an example of a structure of a radio interface protocol between a user equipment (UE) and a gNodeB (gNB).

FIG. 4 shows an example of a structure of a radio interface protocol between a UE and a gNB.

The radio interface protocol is based on a 3GPP radio access network standard. The radio interface protocol horizontally includes a physical layer, a data link layer, and a network layer, and vertically includes a user plane for data information transfer and a control plane for control signaling transfer.

The protocol layers can be classified into a first layer (L1), a second layer (L2), and a third layer (L3) on the basis of lower three layers of an open system interconnection (OSI) model of communication systems.

Hereinafter, each layer of the radio protocol will be described.

A physical layer, i.e., a first layer, provides an information transfer service by using a physical channel. The physical layer is connected to a medium access control (MAC) layer, i.e., an upper layer of the physical layer, via a transport channel. Data is transferred between the MAC layer and the physical layer through the transport channel. In addition, data is transferred between different physical layers, i.e., between physical layers of a transmitting side and a receiving side, through the physical channel.

The second layer includes a medium access control (MAC) layer, a radio link control (RLC) layer, and a packet data convergence protocol (PDCP) layer.

The third layer includes a radio resource control (hereinafter, simply referred to as RRC). The RRC layer is defined only in the control plane, and serves to control the logical channel, the transport channel, and the physical channel in association with configuration, re-configuration, and release of radio bearers (RBs). In this case, the RB is a service provided by the second layer for data transfer between the UE and the E-UTRAN.

The non-access stratum (NAS) layer performs a function such as connection management (session management) and mobility management.

The NAS layer is classified into a NAS entity for mobility management (MM) and a NAS entity for session management (SM).

1) The NAS entity for MM provides the following typical function.

The followings are included as a NAS procedure related to AMF.

Registration management and access management procedure: The AMF supports the following function.

Reliable NAS signal connectivity (integrity protection, encryption) between UE and AMF 2) The NAS entity for SM performs session management between the UE and the SMF.

An SM signaling message is processed, e.g., generated and processed, in a NAS-SM layer of the UE and SMF. Content of the SM signaling message is not interpreted by the AMF.

In case of SM signaling transmission

The NAS entity for MM generates a NAS-MM message to induce a location and method of transferring an SM signaling message through a security header indicating NAS transmission of SM signaling and additional information for NAS-MM to be received.

In SM signaling reception, the NAS entity for SM performs integrity checking of the NAS-MM message, and interprets additional information to induce a place and method for deriving an SM signaling message.

Meanwhile, in FIG. 4, an RRC layer, RLC layer, MAC layer, and PHY layer located below the NAS layer are collectively called an access stratum (AS).

<PDU Session>

A protocol data unit (PDU) session may be initiated and established by a terminal.

A network may release or deactivate a PDU session which is not used by the terminal.

However, when the network deactivates the PDU session, instead of transmitting NAS signaling to the terminal, an N2 release message is transmitted to an access network (AN) to perform an operation of removing (e.g., deleting) a user plane resource for the PDU session. In this case, however, from an AN perspective, the user plane resource for the PDU session is released without distinction of whether the PDU session is released or deactivated.

Since no signaling is received when deactivated, the NAS layer of the terminal cannot recognize whether the PDU session is actually activated or deactivated. Therefore, there is a problem in that data cannot be transmitted although the terminal attempts data transmission unnecessarily at a later time.

In addition, when the AN fails in resource allocation for all QoS flows in a process of establishing the PDU session, the SMF may reject or accept a corresponding PDU session establishment request and may leave it in a deactivated status. If the SMF determines to accept the PDU session and leave it in the deactivated status, the terminal receives a PDU session establishment accept message from the SMF. In this case, there is a problem in that the terminal cannot distinguish whether the PDU session is in an activated status or deactivates status.

Description of Terms

For ease of reference, various terms used in this disclosure are briefly described before going to the detailed description of the disclosure with reference to the accompanying drawings.

UE/MS is an abbreviation of User Equipment/Mobile Station, and it refers to a terminal device. In the drawings, various user equipments (UEs) are shown as examples. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A Serving gateway (Serving GW) is a network node of an EPS network which performs functions, such as mobility anchor, packet routing, idle mode packet buffering, and triggering an MME to page UE.

An eNodeB is an eNodeB of an Evolved Packet System (EPS) and is installed outdoors. The cell coverage of the eNodeB corresponds to a macro cell.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (e.g., an APN or PDN unit) as defined in 3GPP, a unit (e.g., a bearer unit) classified based on QoS within the entire target network, and a destination IP address unit.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A PDN connection is a connection from UE to a PDN, that is, an association (or connection) between UE represented by an IP address and a PDN represented by an APN. It means a connection between entities (e.g., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

PLMN: as an abbreviation of Public Land Mobile Network, means a network identification number of a mobile communication provider. In roaming case of the UE, the PLMN is classified into a home PLMN (HPLMN) and a visited PLMN (VPLMN).

DNN: as an abbreviation of Data Network Name, it is provided to the UE as a name of an access point managed by the network, similarly to the APN. In the 5G system, the DNN is used equivalently to the APN NSSP (Network Slice Selection Policy): It is used by the UE for mapping of an application and S-NSSAI (Session Network Slice Selection Assistance Information).

<Registration Procedure>

A UE may need to obtain authorization to enable mobility tracking, enable data reception, and receive a service. For this, the UE has to be registered to a network. The registration procedure is performed when the UE needs to perform initial registration for the 5G system. In addition, the registration procedure is performed when the UE performs a periodic registration update, moves to a new tracking area (TA) in an idle mode, and needs to perform the periodic registration update.

During the initial registration procedure, an ID of the UE may be obtained from the UE. The AMF may transmit PEI (IMEISV) to the UDM, the SMF, and the PCF.

Figure 5A:
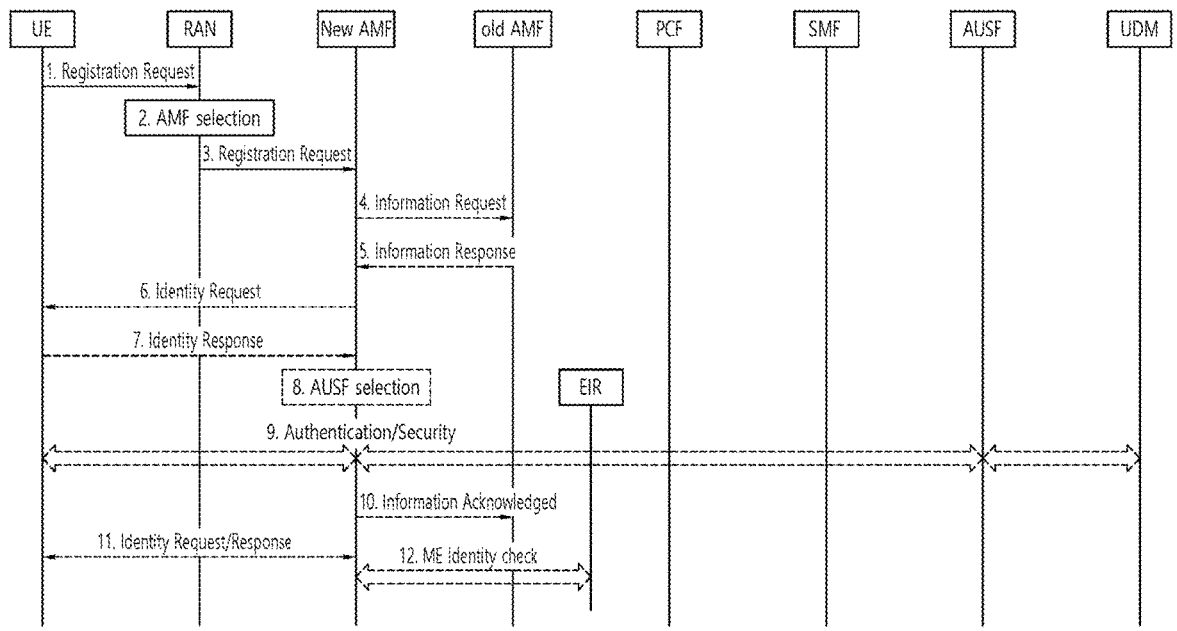
FIG. 5A and FIG. 5B show examples of signal flows of a registration procedure.
Figure 5B:
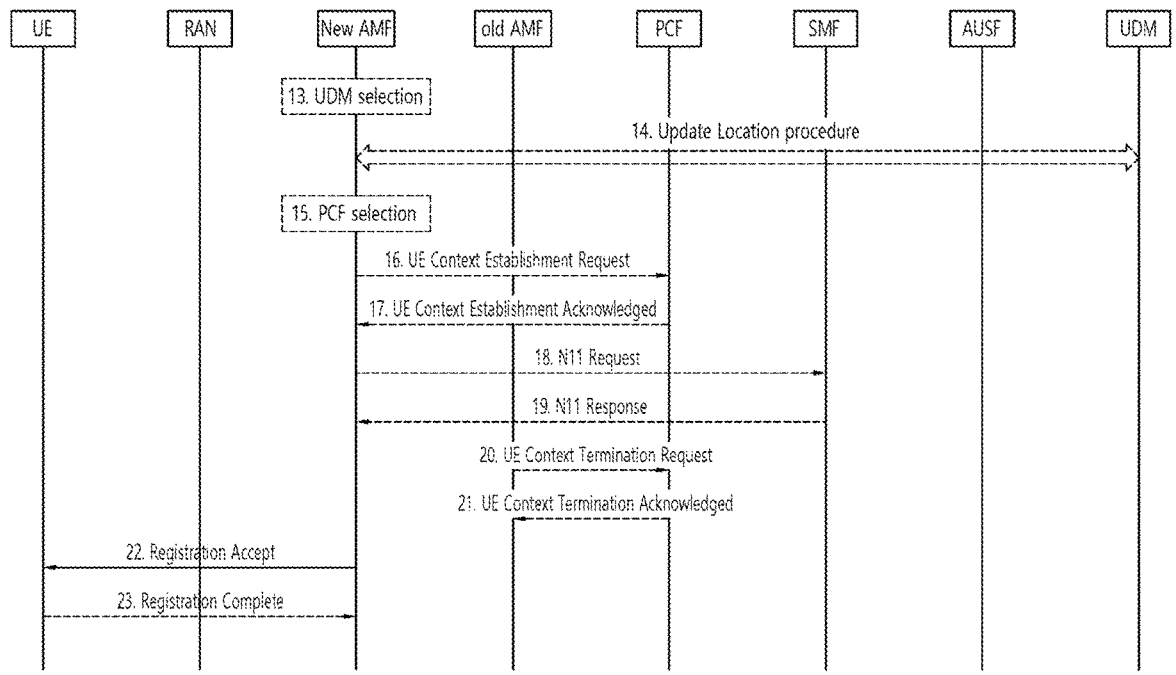

FIG. 5A and FIG. 5B show examples of signal flows of a registration procedure.

1) A UE may transmit an AN message to an RAN. The AN message may include an AN parameter and a registration request message. The registration request message may include information such as a registration type, a subscriber permanent ID or temporary user ID, a security parameter, network slice selection assistance information (NSSAI), 5G capability of the UE, a protocol data unit (PDU) session status, or the like.

In case of 5G RAN, the AN parameter may include a subscription permanent identifier (SUPI) or temporary user ID, a selected network, and an NSSAI.

The registration type may indicate whether the UE is in a state of "initial registration" (i.e., the UE is in an unregistered state), "mobility registration update" (i.e., the UE is in a registered state and starts a registration procedure due to mobility), or "regular registration update" (i.e., the UE is in a registered state and starts a registration procedure due to expiry of a periodic update timer). If the temporary user ID is included, the temporary user ID indicates a last serving AMF. When the UE has already been registered through non-3GPP access in a PLMN different from a PLMN of 3GPP access, the UE may not provide a temporary ID of the UE allocated by the AMF during a registration procedure through the non-3GPP access.

The security parameter may be used for authentication and integrity protection.

The PDU session status may indicate a (previously configured) PDU session that can be used in the UE.

2) If SUPI is included or a temporary user ID does not indicate a valid AMF, the RAN may select the AMF on the basis of (R)AT and NAASI.

If the (R)AN cannot select a proper AMF, any AMF is selected according to a local policy, and a registration request is transferred to the selected AMF. If the selected AMF cannot serve the UE, the selected AMF selects more proper another AMF for the UE.

3) The RAN transmits an N2 message to a new AMF. The N2 message includes an N2 parameter and a registration request. The registration request may include a registration type, a subscriber permanent identifier or temporary user ID, a security parameter, an NSSAI and MICO mode default configuration, and the like.

When 5G-RAN is used, the N2 parameter includes location information, which is related to a cell to which a UE camps, a cell identifier, and an RAT type.

If the registration type indicated by the UE is a periodic registration update, the processes (4) to (17) described below may not be performed.

4) The newly selected AMF may transmit an information request message to the old AMF.

When the temporary user ID of the UE is included in the registration request message and the serving AMF has changed after a last registration, the new AMF may transmit the information request message including complete registration request information to the old AMF to request for UE's SUPI and MM context.

5) The old AMF transmits an information acknowledged message to the newly selected AMF. The information acknowledged message may include SUPI, MM context, and SMF information.

Specifically, the old AMF transmits the information acknowledged message including the UE's SUPI and MM context.

When the old AMF has information on an activated PDU session, the old AMF may include information, which includes an SMF ID and a PDU session ID, in the information acknowledged message.

6) The new AMF transmits an identity request message to the UE if the SUPI is not provided by the UE or is not searched for from the old AMF.

7) The UE transmits an identity response message including the SUPI to the new AMF.

8) The AMF may determine to trigger the AUSF. In this case, the AMF may select the AUSF on the basis of the SUPI.

9) The AUSF may start authentication of UE and NAS security functions.

10) The new AMF may transmit the information acknowledged message to the old AMF.

If the AMF has changed, the new AMF may transmit the information acknowledged message in order to check the transfer of the UE MM context.

At the failure of the authentication/security procedure, the registration is rejected and the new AMF may transmit a reject message to the old AMF.

11) The new AMF may transmit an identity request message to the UE.

When the PEI is not provided by the UE or is not searched for from the old AMF, the identity request message may be transmitted in order for the AMF to search for the PEI.

12) The new AMF checks an ME identity.

13) If the process (14) described below is performed, the new AMF selects the UDM on the basis of the SUPI.

14) If the AMF is changed after the final registration, or if there is no valid subscription context for the UE in the AMF, or if the UE provides the SUPI which does not refer to context which is valid in the AMF, then the new AMF starts an update location procedure. Alternatively, the procedure may also start when the UDM starts the cancel location for the old AMF. The old AMF discards the MM context and notifies it to all possible SMF(s), and the new AMF generates the MM context for the UE after obtaining AMF-related subscription data from the UDM.

When network slicing is used, the AMF obtains a requested NSSAI and an NSSAI allowed based on a UE subscription and local policy. If the AMF is not appropriate to support the allowed NSSAI, a registration request is routed again.

15) The new AMF may select the PCF on the basis of the SUPI.

16) The new AMF transmits a UE context establishment request message to the PCF. The AMF may request the PCF to provide an operator policy for the UE.

17) The PCF transmits a UE context establishment acknowledged message to the new AMF.

18) The new AMF transmits an N11 request message to the SMF.

Specifically, when the AMF is changed, the new AMF notifies the new AMF which serves the UE to each SMP. The AMF verifies a PDU session status from the UE as available SMF information. When the AMF is changed, the available AMF information may be received from the old AMF. The new AMF may request the SMF to release a network resource related to a PDU session not activated in the UE.

19) The new AMF transmits an N11 response message to the SMF.

20) The old AMF transmits a UE context termination request message to the PCF.

If the old AMF has previously requested to configure the UE context in the PCF, the old AMF may delete the UE context in the PCF.

21) The PCF may transmit a UE context termination request message to the old AMF.

22) The new AMF transmits a Registration Accept message to the UE. The Registration Accept message may include a temporary user ID, a registration area, a mobility limitation, a PDU session status, an NSSAI, a regular registration update timer, and an allowed MICO mode.

The Registration Accept message may include information of the allowed NSSAI and the mapped NSSAI. The allowed NSSAI information for the access type of the UE may be included in the N2 message including the Registration Accept message. The information on the mapped NSSAI is information in which each S-NSSAI of the allowed NSSAI is mapped to an S-NASSI of an NSSAI configured for an HPLMN.

If the AMF allocates a new temporary user ID, the temporary user ID may be further included in the Registration Accept message. If the mobility limitation is applied to the UE, information indicating the mobility limitation may be additionally included in the Registration Accept message. The AMF may allow the Registration Accept message to include information indicating the PDU session status for the UE. The UE may remove any internal resource related to a PDU session which is not indicated as being activated in the received PDU session status. If the PDU session status information exists in the registration request, the AMF may allow the registration accept message to include information indicating the PDU session status for the UE.

23) The UE transmits a Registration Complete message to the new AMF.

<PDU Session Establishment Procedure>

A protocol data unit (PDU) session establishment procedure may have two types of PDU session establishment procedures as follows.

PDU session establishment procedure initiated by UE

PDU session establishment procedure initiated by network. For this, the network may transmit a device trigger message to application(s) of the UE.

Figure 6A:
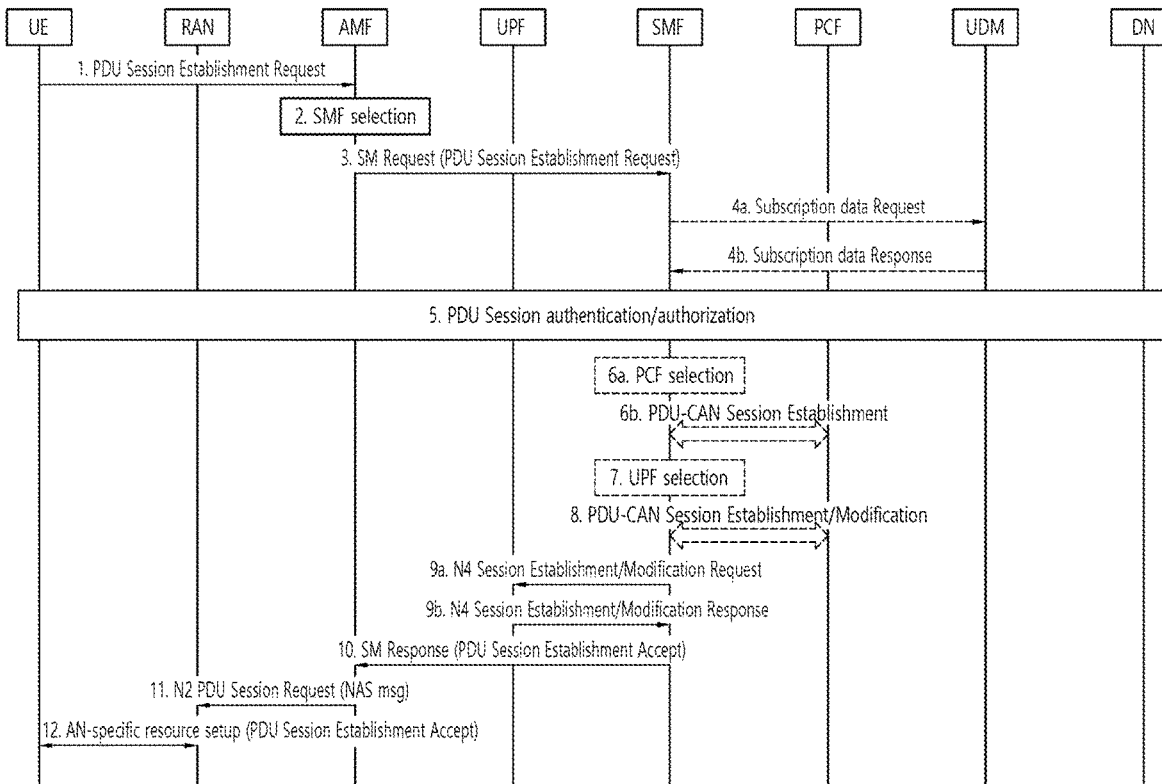
FIG. 6A and FIG. 6B show examples of signal flows of a PDU session establishment procedure.
Figure 6B:
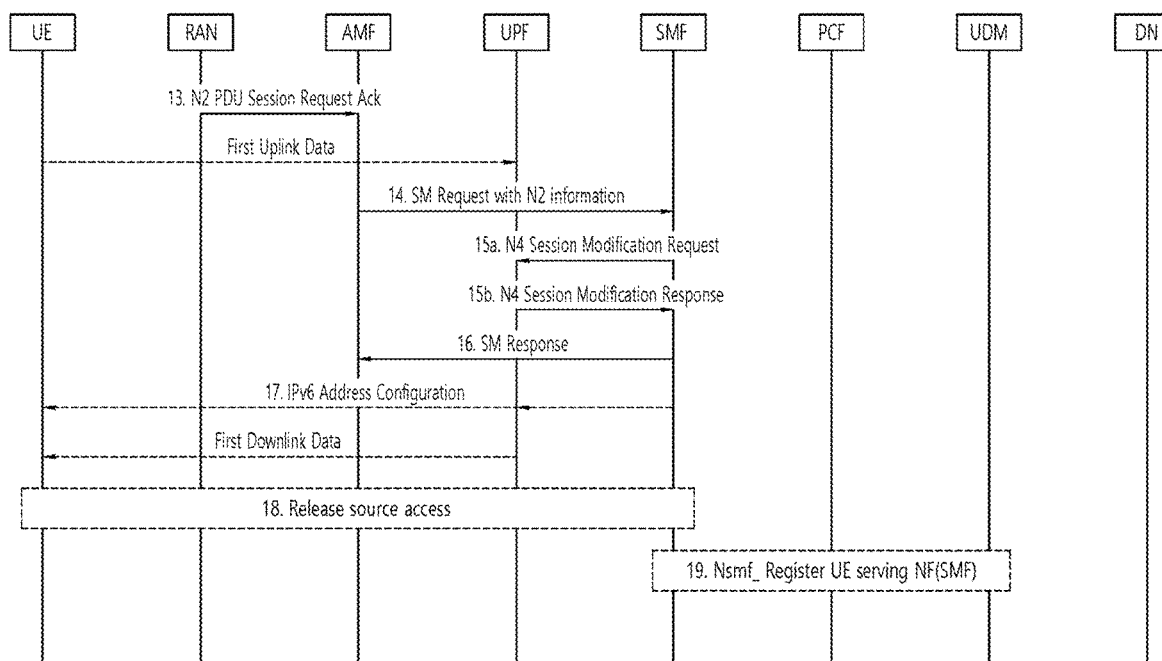

FIG. 6A and FIG. 6B show examples of signal flows of a PDU session establishment procedure.

It is assumed in the procedure of FIG. 6A and FIG. 6B that a UE has already been registered on an AMF according to the registration procedure of FIGS. 5A and 5B. Therefore, it is assumed that the AMF has already obtained user subscription data from a UDM 1) The UE transmits a NAS message to the AMF. The message may include S-NSSAI (Session Network Slice Selection Assistance Information), DNN, PDU session ID, request type, N1 SM information, or the like.

Specifically, the UE includes an S-NSSAI from an allowed NSSAI of a current access type. If information on the mapped NSSAI is provided to the UE, the UE may provide both an S-NSSAI based on the allowed NSSAI and a corresponding S-NSSAI based on the information of the mapped NSSAI. Herein, the information of the mapped NSSAI is information in which each S-NSSAI of the allowed NSSAI is mapped to an S-NASSI of an NSSAI configured for an HPLMN.

More specifically, the UE may extract and store information of the allowed S-NSSAI and the mapped S-NSSAI, included in the Registration Accept message received from a network (i.e., AMF) in the registration procedure of FIGS. 5A and 5B. Accordingly, the UE may transmit the PDU session establishment request message by including both the S-NSSAI based on the allowed NSSAI and the corresponding S-MSSAI based on the information of the mapped NSSAI.

To establish the new PDU session, the UE may generate a new PDU session ID.

The UE may start the PDU session establishment procedure initiated by the UE by transmitting the NAS message including the PDU session establishment request message in the N1 SM information. The PDU session establishment request message may include a request type, an SSC mode, and a protocol configuration option.

If the PDU session establishment is for configuring a new PDU session, the request type indicates "initial request". However, if the existing PDU session is present between a 3GPP access and a non-3GPP access, the request type may indicate "existing PDU session".

The NAS message transmitted by the UE is encapsulated in the N2 message by the AN. The N2 message is transmitted to the AMF, and may include user location information and access scheme type information.

N1 SM information may include an SM PDU DN request container including information on PDU session authentication based on an external DN.

2) If the request type indicates the "initial request" and if the PDU session ID is not used for the existing PDU session of the UE, the AMF may determine that a message corresponds to a request for a new PDU session.

If the NAS message does not include the S-NSSAI, the AMF may determine a default S-NSSAI for a PDU session requested according to a UE subscription. The AMF may store the PDU session ID and the SMF ID in an association manner.

3) The AMF transmits an SM request message to the SMF. The SM request message may include a subscriber permanent ID, a DNN, an S-NSSAI, a PDU session ID, an AMF ID, N1 SM information, user location information, and an access scheme type. The M1 SM information may include a PDU session ID and a PDU session establishment request message.

The AMF ID is used to identify the AMF which serves the UE. The N1 SM information may include a PDU session establishment request message received from the UE.

4a) The SMF transmits a subscriber data request message to the UDM. The subscriber data request message may include a subscriber permanent ID and a DNN.

If the request type indicates the "existing PDU session" in the above process (3), the SMF determines that a corresponding request is caused by a handover between the 3GPP access and the non-3GPP access. The SMF may identify the existing PDU session on the basis of the PDU session ID.

If the SMF has not yet searched for SM related subscription data for a UE related to the DNN, the SMF may request for subscriber data.

4b) The UDM may transmit a subscription data response message to the SMF.

The subscription data may include information on an authenticated request type, an authenticated SSC mode, and a default QoS profile.

The SMF may check whether a UE request conforms to a user subscription and local policy. Alternatively, the SMF rejects the UE request through NAS SM signaling (including a related SM reject cause) transferred by the AMF, and the SMF informs the AMF of that it shall be regarded that a PDU session ID is released.

5) The SMF transmits a message to the DM through the UPF.

Specifically, if the SMF needs to approve/authenticate the PDU session establishment, the SMF selects the UPF and triggers the PDU.

At the failure of PDU session establishment authentication/authorization, the SMF terminates the PDU session establishment procedure and informs the UE of the rejection.

6a) When dynamic PCC is distributed, the SMF selects the PCF.

6b) The SMF may start establishment of a PDU-CAN session towards the PCF to obtain the default PCC rule for the PDU session. If the request type of the process (3) indicates the "existing PDU session", the PCF may start to modify the PDU-CAN session.

7) If the request type of the process (3) indicates the "initial request", the SMF selects an SSC mode for the PDU session. If the process (5) is not performed, the SMF may also select the UPF. In case of a request type IPv4 or IPv6, the SMF may allocate an IP address/prefix for the PDU session.

8) If the dynamic PCC is deployed and the PDU-CAN session has not been completely established yet, the SMF may start the PDU-CAN session initiation.

9) If the request type indicates the "initial request" and the process (5) is not performed, the SMF uses the selected UPF to start the N4 session establishment procedure, and otherwise, may use the selected UPF to start the N4 session modification procedure.

9a) The SMF transmits the N4 session establishment/modification request message to the UPF. In addition, the SMF may provide a packet discovering, executing, and reporting rule to be installed in the UPF with respect to the PDU session. If CN tunnel information is allocated by the SMF, the CN tunnel information may be provided to the UPF.

9b) The UPF may respond by transmitting the N4 session establishment/modification response message. If the CN tunnel information is allocated by the UPF, the CN tunnel information may be provided to the SMF.

10) The SMF transmits the SM response message to the AMF. The message may include a cause, N2 SM information, and N1 SM information. The N2 SM information may include a PDU session ID, a QoS profile, and CN tunnel information. The S1 SM information may include a PDU session establishment accept message. The PDU session establishment accept message may include an allowed QoS rule, an SSC mode, an S-NSSAI, and an allocated IPv4 address.

The N2 SM information is information to be transferred from the AMF to the RAN and may include the followings.

CN tunnel information: This corresponds to a core network address of an N3 tunnel corresponding to a PDU session.

QoS profile: This is used to provide the RAN with mapping between a QoS parameter and a QoS flow identifier.

PDU session ID: This may be used so that a relation between a PDU session and AN resources for the UE is indicated in the UE by AN signaling for the UE.

Meanwhile, the N1 SM information includes a PDU session accept message to be provided by the AMF to the UE.

Multiple QoS rules may be included in N1 SM information and N2 SM information included in the PDU session establishment accept message.

The SM response message also includes the PDU session ID and information used when the AMF determines which target UE is used as well as which access is to be used for the UE.

11) The AMF transmits an N2 PDU session request message to the RAN. The message may include N2 SM information and a NAS message. The NAS message may include a PDU session ID and a PDU session establishment accept message.

The AMF may transmit the NAS message including the PDU session ID and the PDU session establishment accept message. In addition, the AMF transmits the N2 PDU session request message to the RAN by including N2 SM information received from the SMF.

12) The RAN may exchange specific signaling with respect to a UE related to information received from the SMF.

The RAN also allocates RAN N3 tunnel information with respect to the PDU session.

The RAN transfers to the UE the NAS message provided in the process (10). The NAS message may include a PDU session ID and N1 SM information. The N1 SM information may include a PDU session establishment accept message.

The RAN transmits the NAS message to the UE only when the necessary RAN resource is configured and the RAN tunnel information is successfully allocated.

13) The RAN transmits an N2 PDU session response message to the AMF. The message may include a PDU session ID, a cause, and N2 SM information. The N2 SM information may include a PDU session ID, (AN) tunnel information, and an allowed/rejected QoS profile list.

The RAN tunnel information may correspond to an access network address of an N3 tunnel corresponding to a PDU session.

14) The AMF may transmit an SM request message to the SMF. The SM request message may include N2 SM information. Herein, the AMF may transfer to the SMF the N2 SM information received from the RAN.

15a) If an N4 session for the PDU session has not be configured yet, the SMF may start the N4 session establishment procedure together with the UPF. Otherwise, the SMF may use the UPF to start the N4 session modification procedure. The SMF may provide AN tunnel information and CN tunnel information. The CN tunnel information may have to be provided only when the SMF selects the CN tunnel information in the process (8).

15b) The UPF may transmit the N4 session establishment/modification response message to the SMF.

16) The SMF may transmit the SM response message to the AMF. When this process ends, the AMF may transfer a related event to the SMF. This occurs in case of performing a handover in which RAN tunnel information is changed or the AMF is reallocated.

17) The SMF transmits information to the UE through the UPF. Specifically, in case of PDU type IPv6, the SMF may generate IPv6 router advertisement and may transmit it to the UE through the N4 and the UPF.

18) If the PDU session establishment request is caused by a handover between a 3GPP access and a non-3GPP access, that is, if the request type is set to the "existing PDU session", the SMF releases a user plane through a source access (3GPP or non-3GPP access).

19) If the SMF ID is not included in the process (4b) by the UDM of DNN subscription context, the SMF may call "UDM Register UE serving NF service" by including the SMF address and the DNN. The UDM may store the SMF ID, address, and related DNN.

If the PDU session is not successfully established during the procedure, the SMF reports this to the AMF.

Problem to be Solved Through Implementations of the Present Disclosure

In some implementations, a network may release or deactivate a PDU session that is not used by a terminal.

First, in some implementations, if an SMF releases a PDU session, then the SMF transmits a PDU session release command message to the terminal to report the release of the PDU session. However, if the terminal is in an idle state, then the SMF may perform an implicit release instead of transmitting the PDU session release command message to the terminal. In this case, if the terminal transitions to a connected state, then PDU session status information is received, and the terminal may implicitly recognize that the PDU session is released based on the received PDU session status information.

Next, if the SMF deactivates the PDU session, then instead of transmitting NAS signaling to the terminal, an N2 release message is transmitted to an AN to perform an operation of removing (e.g., deleting) a user plane resource for the PDU session. In this case, however, from an AN perspective, the user plane resource for the PDU session is released without distinguishing between whether the PDU session is released or deactivated.

Since no signaling is received when a PDU session is deactivated, the terminal cannot recognize whether the PDU session is actually activated or deactivated. Accordingly, in order to transmit data through a corresponding PDU session at a later time, whether or not to activate the PDU session cannot be determined through transmission of a service request message. Therefore, the terminal unnecessarily attempts data transmission. If data is transmitted from a higher layer of the terminal but there is no actual user plane resource in the AS layer of the terminal, then a problem may arise in that the data is dropped, and actual data cannot be transmitted.

In addition, if the AN fails in resource allocation for all QoS flows in the process of creating the PDU session, then the SMF may reject or accept a corresponding PDU session establishment request and may leave the PDU session in a deactivated status. If the SMF accepts the PDU session and determines to leave the PDU session in the deactivated status, then the terminal receives a PDU session establishment accept message from the SMF. In this case, a problem may arise in that the terminal cannot distinguish whether the PDU session is in an activated status or in a deactivated status.

<Implementations of the Present Disclosure>

Accordingly, some implementations of the present disclosure enable techniques in which a terminal manages a PDU session status (e.g., either activated or deactivated) in a 5G system (e.g., 5G mobile communication system, a next-generation mobile communication system, etc.).

I. First Implementation: Technique of Using NAS Signaling

If an SMF deactivates a PDU session, a technique of directly reporting a PDU session status to a terminal through NAS signaling may be used. In this case, the SMF may transmit the PDU session status (e.g., activated or deactivated) by including it into a PDU session establishment accept message or a PDU session modification command message. In this case, the deactivated case may always be reported, or only the activated case may be reported or only the deactivated case may be reported. Upon receiving the PDU session establishment accept message and the PDU session modification command message, the terminal needs to store the PDU session status. Since status information is reported correctly from a network when using this technique, an interaction between an AS layer and a NAS layer is not necessary, but signaling may be increased between the terminal and the network.

Figure 7:
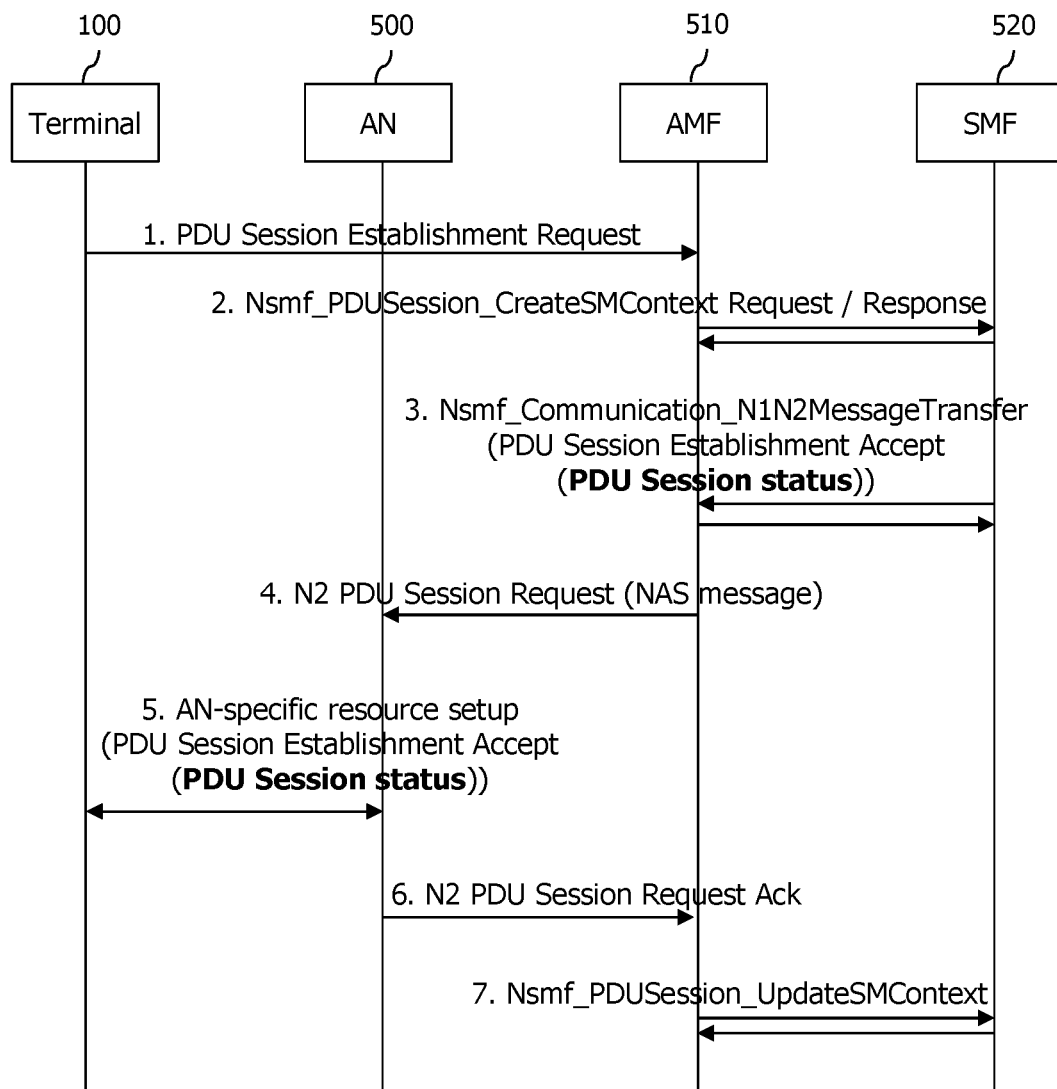
FIG. 7 shows an example of a PDU session establishment procedure according to a first implementation of the present disclosure.

FIG. 7 shows an example of a PDU session establishment procedure according to a first implementation of the present disclosure.

The example of FIG. 7 relates to an example in which NAS signaling is transmitted in a situation where an SMF determines to activate a PDU session in a PDU session establishment procedure and an AN successfully performs an N2 setup.

1) A terminal 100 transmits a PDU session establishment request message to create a PDU session.

2) An AMF 510 transmits the PDU session establishment request message, received from the terminal 100, to an SMF 520 by using an Nsmf_PDUSession_CreateSMContext service.

3) If the PDU session establishment request of the terminal 100 is accepted, the SMF 520 additionally determines whether to directly activate or deactivate the PDU session. Upon determining to activate the PDU session, the SMF 520 transmits a PDU session establishment accept message to the terminal 100 by indicating "activated" in a PDU session status. In addition, in order to allocate a user plane resource, the SMF 520 transmits an N2 PDU session request message together.

4) The AMF 510 transmits to an AN 500 a NAS message (i.e., PDU session establishment accept message) to be sent to the terminal 100 together with the N2 PDU session request message.

5) Upon receiving the N2 PDU session request message, the AN 500 allocates the user plane resource for a corresponding PDU session. In this process, the AN 500 transmits the PDU session establishment accept message to the terminal 100. A NAS layer of the terminal 100 recognizes that a corresponding PDU session is successfully activated, based on the PDU session status in the PDU session establishment accept message.

6) The AN 500 transmits an N2 PDU session request acknowledgement (Ack) message in response to the N2 PDU session request message.

7) The AMF 510 transmits the N2 PDU session request Ack message, received from the AN 500, to the SMF 520 through an Nsmf_PDUSession_UpdateSMContext service. Upon receiving the message, the SMF 520 recognizes that a corresponding PDU session is successfully activated.

Figure 8:
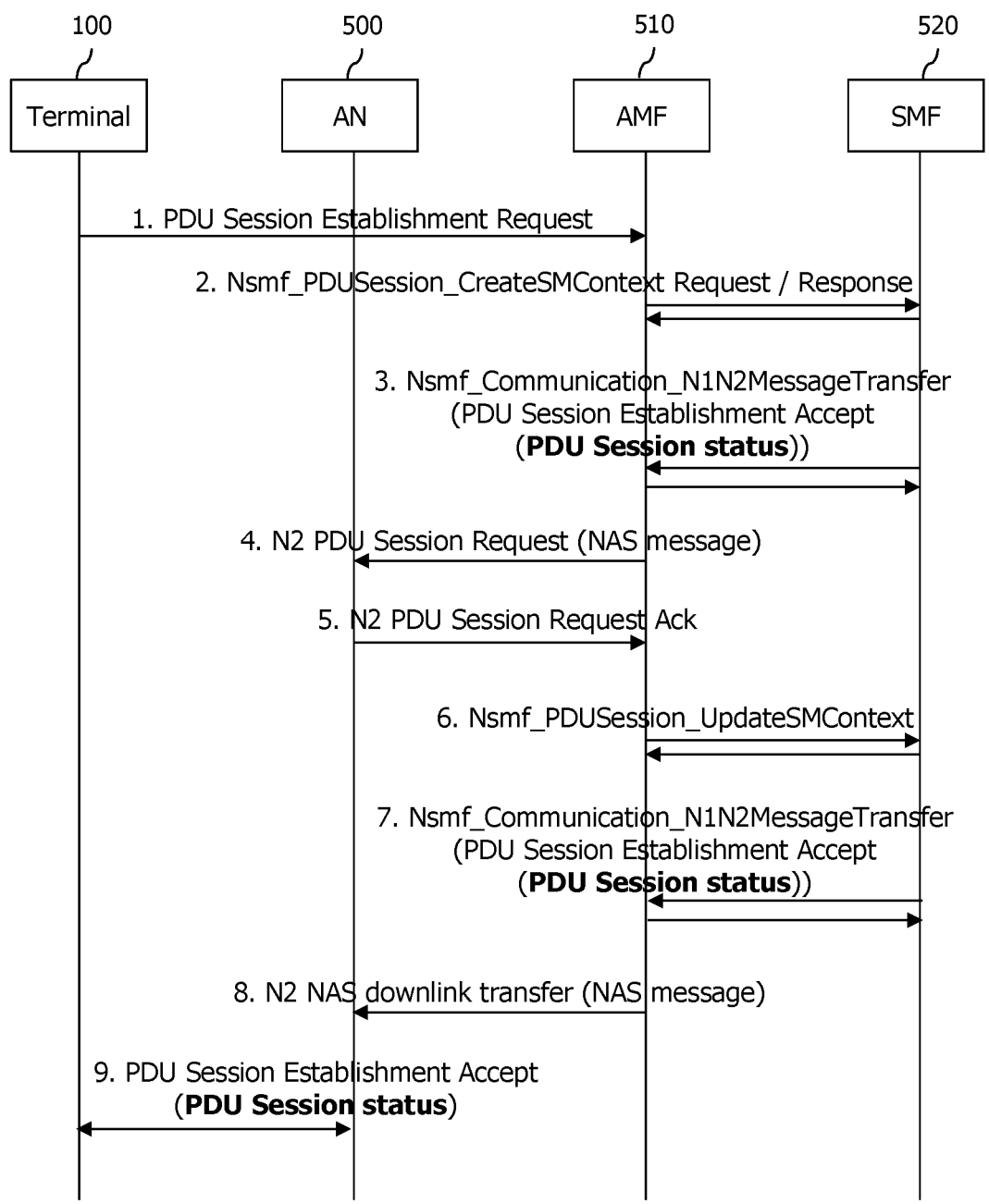
FIG. 8 shows another example of a PDU session establishment procedure according to a first implementation of the present disclosure.

FIG. 8 is another example of a PDU session establishment procedure according to a first implementation of the present disclosure.

The example of FIG. 8 relates to an example in which NAS signaling is transmitted in a situation where an SMF determines to activate a PDU session in a PDU session establishment procedure and an AN fails in an N2 setup.

1-4) Since these processes are the same as the processes (1) to (4) of FIG. 7, the description of FIG. 7 will be applied without repetition of the same description.

5) Although the AN 500 has received the N2 PDU session request message, a user plane resource for a corresponding PDU session cannot be allocated, due to a certain reason (e.g., when RAN resources are not enough).

Therefore, the AN 500 does not transmit the PDU session establishment accept message, and informs the SMF 520 of the failure in the user plane resource allocation. Alternatively, the AN 500 informs that user plane resources for all QoS flows are not allocated.

The AN 500 transmits an N2 PDU session request acknowledgement (Ack) message in response to the N2 PDU session request message.

6) The AMF 510 transmits the N2 PDU session request Ack message, received from the AN 500, to the SMF 520 through an Nsmf_PDUSession_UpdateSMContext service.

7) The SMF 520 recognizes that a user plane resource for a corresponding PDU session cannot be allocated and transmits a new session establishment accept message to the terminal 100, based on information included in the N2 PDU session request Ack message received from the AN 500. Alternatively, the SMF 520 may transmits a PDU session establishment reject message to the terminal 100.

In this case, the SMF 520 may transmit the PDU session establishment accept message by setting a PDU session status included in the message to "deactivated".

8) The AMF 510 transmits a PDU session establishment accept message, received from the SMF 520, to the AN 500 by using a downlink NAS transport.

9) A NAS layer of the terminal 100 recognizes that a corresponding PDU session is successfully set up but is deactivated, based on the PDU session status included in the PDU session establishment accept message.

Figure 9:
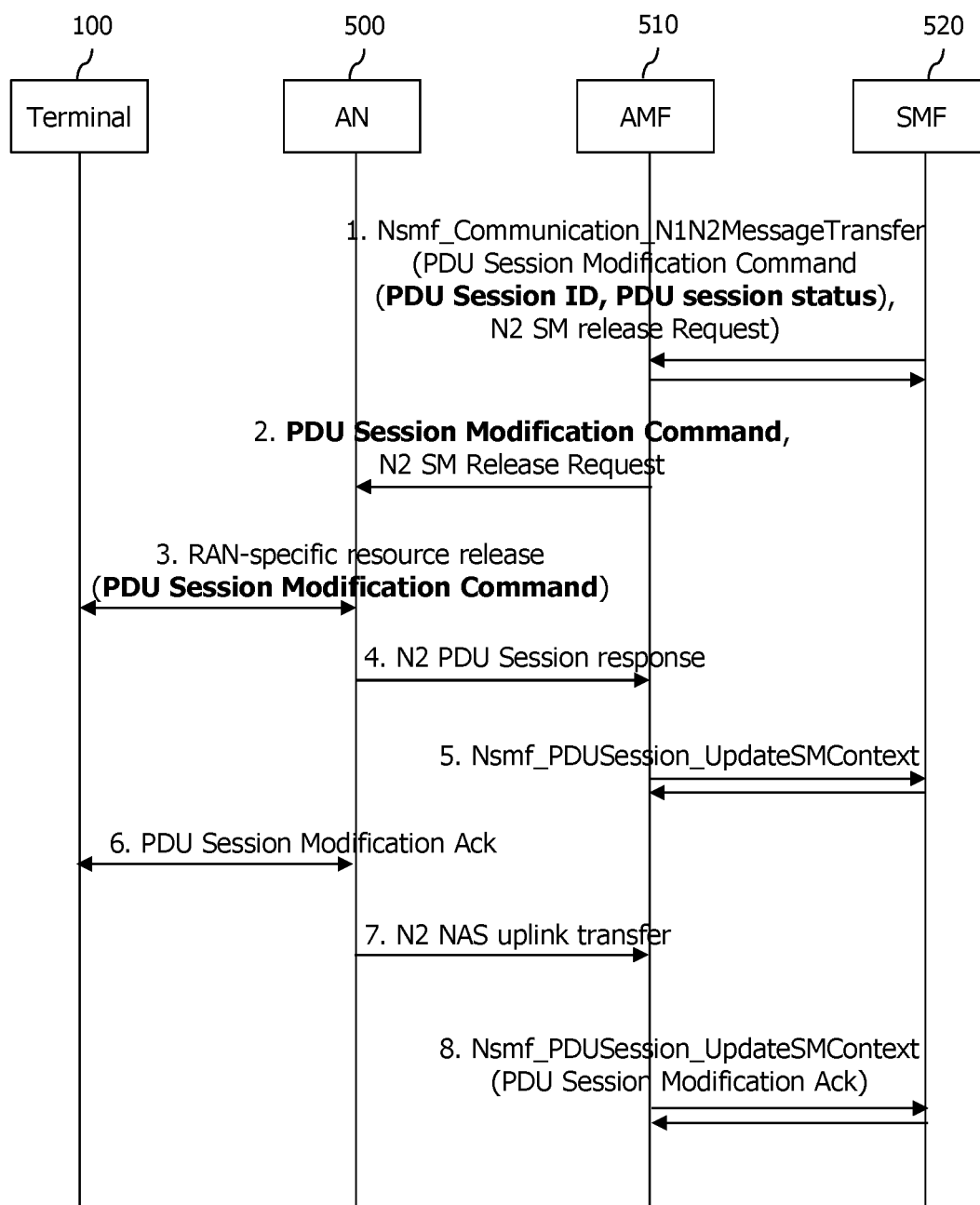
FIG. 9 shows an example of a procedure in which an SMF deactivates a PDU session according to a first implementation of the present disclosure.

FIG. 9 shows an example of a procedure in which an SMF deactivates a PDU session according to a first implementation of the present disclosure.

In the example of FIG. 9, an example of transmitting NAS signaling is shown as a CN-initiated PDU session deactivation procedure.

1) The SMF 520 transmits to the terminal 100 a PDU modification command message including an ID of a PDU session to be deactivated and a PDU session status (e.g., deactivated).

In addition, the SMF 520 transmits the N2 SM release request message to the AN 500 in order to release a radio resource in the AN 500.

The messages are transmitted through an Namf_Communication_N1N2MessageTranfer service.

2) The AMF 510 transmits to the AN 500 the PDU session modification command message and N2 SM release request message received from the SMF 520.

3) The AN 500 transmits the PDU session modification command message to the terminal 100 while releasing an AN resource.

4) After releasing the AN resource, the AN 500 transmits the N2 SM release request message to the AMF 510.

5) The AMF 510 transmits the N2 SM release response message, received from the AN 500, to the SMF 520 by using an Nsmf_PDUSession_UpdateSMContext service.

6) After receiving the PDU session modification command message, the terminal 100 recognizes that a status of a corresponding PDU session is "deactivated" and stores this. In addition, in response to the PDU session modification command message, a PDU session modification Ack message is transmitted.

7) The AN 500 transmits to the AMF 510 the PDU session modification Ack message received from the terminal.

8) The AMF 510 transmits to the SMF 520 the PDU session modification Ack message by using an Nsmf_PDUSession_UpdateSMContext service.

In the above description, a new NAS message (e.g., PUD session deactivation command message/PDU session deactivation command Ack message) may be used, instead of the PDU session modification command message/PDU session modification Ack message.

II. Second Implementation: Technique of Using AS Layer Indication

As disclosed in the first implementation, the SMF may not perform reporting through NAS signaling. Instead, according to a second implementation, when all radio resources for a specific PDU session are released, an AS layer of a terminal may report to a NAS layer that a radio resource of a corresponding PDU session is released. In addition, if the radio resource for the specific PDU session is allocated, the AS layer of the terminal may report to the NAS layer that the radio resource is allocated. That is, if the radio resource for the specific PDU session is allocated, the AS layer may report this to the NAS layer. Network signaling may be decreased by using this technique since activation/deactivation is recognized in the NAS layer without NAS signaling transmitted/received on a network unlike in the first implementation. However, implementation may be complicated due to an increase in interaction between the AS layer and the NAS layer.

II-1. First Technique of Second Implementation

When a radio resource is successfully allocated by a network (RAN) in a PDU session establishment procedure, an AS layer of a terminal may transfer to a NAS layer an indication/information indicating that the radio resource is allocated. In addition, the NAS layer of the terminal may receive a PDU session establishment accept message, and may determine whether a PDU session is in an activated status or in a deactivated status on the basis of the indication/information transferred from the AS layer. That is, when the PDU session establishment accept message is received but the information/information indicating that the radio resource for the PDU session is allocated is not received, the NAS layer may determine that the PDU session is in the deactivated status and may store this.

Figure 10:
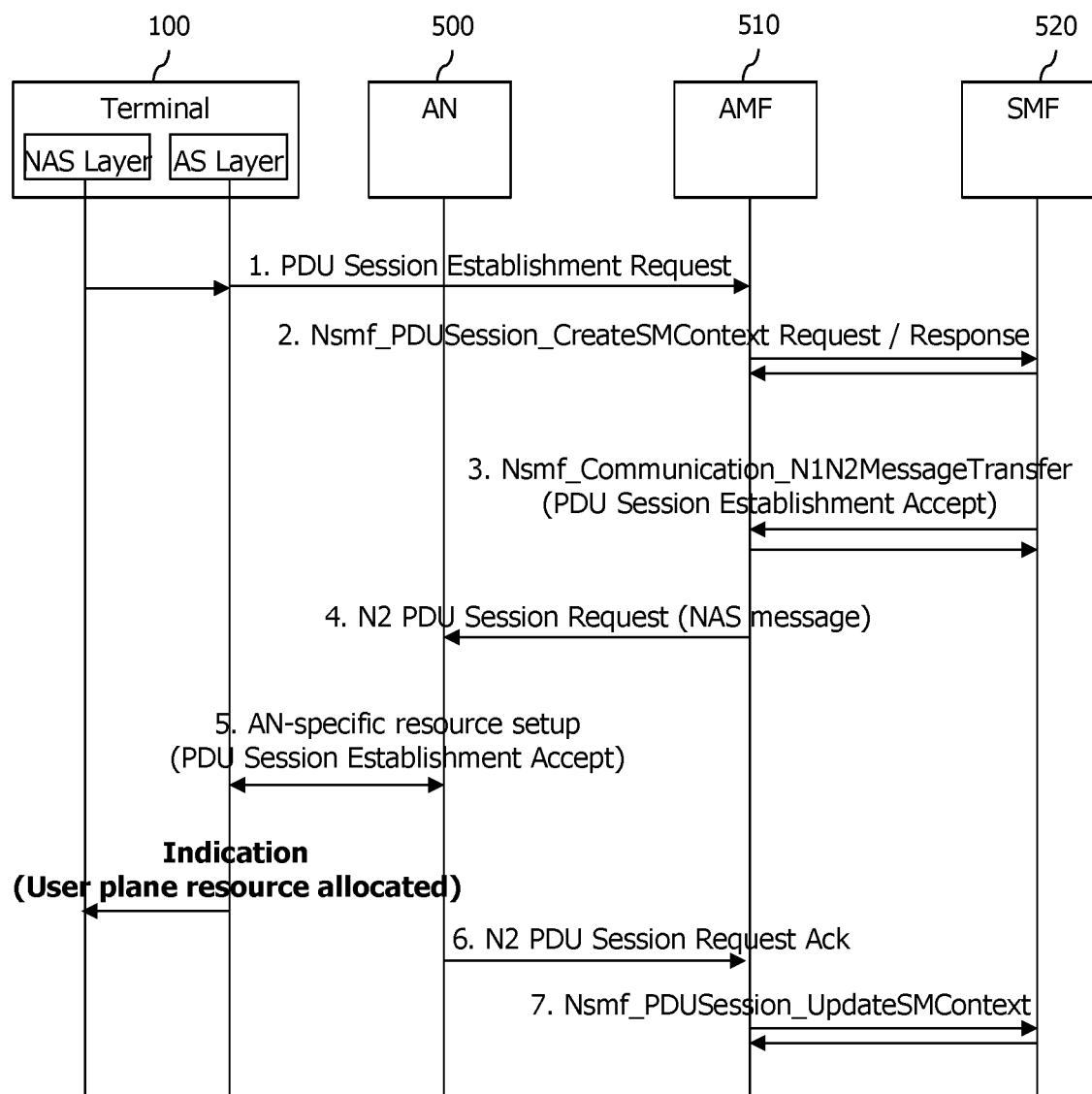
FIG. 10 shows an example of a successful PDU session establishment procedure according to a first technique of a second implementation of the present disclosure.

FIG. 10 shows an example of a successful PDU session establishment procedure according to a first technique of a second implementation of the present disclosure.

1) The terminal 100 transmits a PDU session establishment request message to the AMF 510 via the AN 500 to crease a PDU session.

2) The AMF 510 transmits to the SMF 520 the PDU session establishment request message sent from the terminal 100 by using an Nsmf_PDUSession_CreateSMContext service.

3) If the request of the terminal 100 is accepted, the SMF 520 additionally determines whether to directly activate or deactivate the PDU session. Upon determining to activate it, the SMF 520 transmits an N2 PDU session request message by using Nsmf_Communication_N1N2MessageTransfer. In this case, a PDU session establishment accept message may be transferred together.

4) The AMF 510 transmits to the AN 500 the N2 PDU session request message and a NAS message (e.g., including the PDU session establishment accept message) to be sent to the terminal 100.

5) The AN 500 receives the N2 PDU session request message and allocates a user plane resource for a corresponding PDU session. In addition, the AN 500 transmits the PDU session establishment accept message to the terminal 100.

Then, an AS layer of the terminal 100 transfers to a NAS layer an indication/information indicating that the user plane resource is successfully allocated. The NAS layer of the terminal 100 recognizes that the PDU session is successfully activated, since the PDU session establishment accept message is received and the indication/information is also received from the AS layer.

6) The AN 500 transmits to the AMF 510 an N2 PDU session Ack message in response to the N2 PDU session request message.

7) The AMF 510 transmits to the SMF 520 the N2 PDU session request message Ack message received from the AN 500 through an Nsmf_PDUSession_UpdateSMContext service. The SMF 520 receives this and recognizes that the PDU session is successfully activated.

Figure 11:
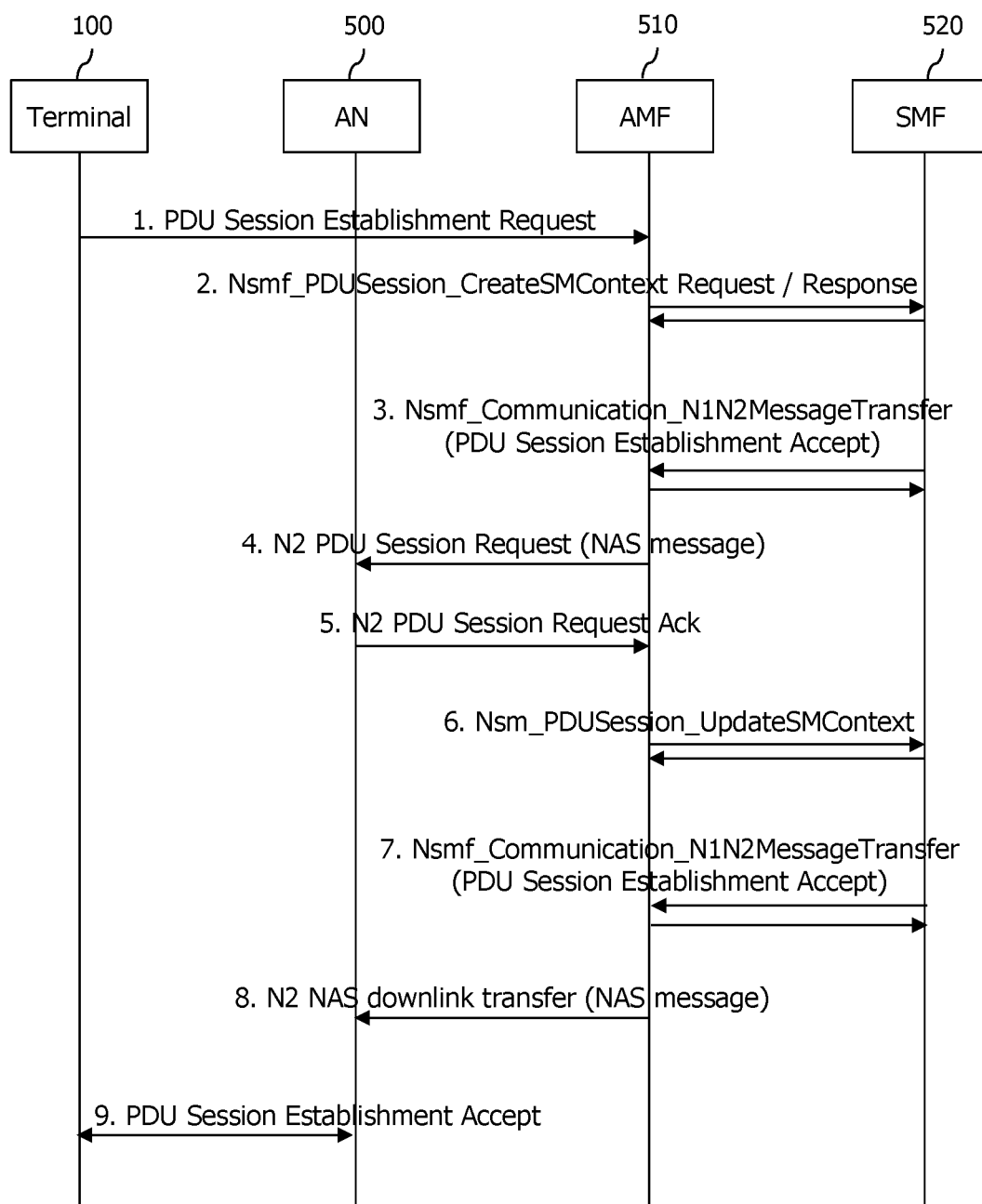
FIG. 11 shows an example of a failed N2 setup in a PDU session establishment process according to a first technique of a second implementation of the present disclosure.

FIG. 11 shows an example of a failed N2 setup in a PDU session establishment process according to a first technique of a second implementation of the present disclosure.

1-4) Since these processes are the same as the processes (1) to (4) of FIG. 10, the description of FIG. 10 will be applied without repetition of the same description.

5) Although the AN 500 has received the N2 PDU session request message, a user plane resource for a corresponding PDU session cannot be allocated, due to a certain reason (e.g., when RAN resources are not enough).

Therefore, the AN 500 does not transmit the PDU session establishment accept message, and informs the SMF 520 of the failure in the user plane resource allocation. Alternatively, the AN 500 informs that user plane resources for all QoS flows are not allocated.

6) The AMF 510 transmits the N2 PDU session request Ack message, received from the AN 500, to the SMF 520 through an Nsmf_PDUSession_UpdateSMContext service.

7) The SMF 520 recognizes that a user plane resource for a corresponding PDU session cannot be allocated and transmits a new session establishment accept message to the terminal 100, based on information included in the N2 PDU session request Ack message received from the AN 500. Alternatively, the SMF 520 may transmits a PDU session establishment reject message to the terminal 100.

8) The AMF 510 transmits a PDU session establishment accept message, received from the SMF 520, to the AN 500 by using a downlink NAS transport.

9) A NAS layer of the terminal 100 recognizes that the PDU session is deactivated since the PDU session establishment accept message is received but no indication/information is received from the AS layer.

Meanwhile, upon determining to deactivate the PDU session, the SMF 520 transmits the N2 release request message to the RAN 500. The message may be the same as a message to be sent to the AN 500 when the SMF 520 generally releases the PDU session. In this case, the AN 500 cannot recognize whether the SMF determines to deactivate or release the PDU session. Accordingly, the AS layer of the terminal 100 may report only that a radio resource for a specific PDU session is released, while transferring the indication/information to the NAS layer. Nonetheless, upon receiving the indication/information from the AS layer, the NAS layer of the terminal 100 may know that the PDU session is deactivated, since the PDU session release command is not received from the SMF 520. This may be achieved when the SMF 520 determines to release the PDU session, under the assumption that the PDU session release command is always sent.

Figure 12:
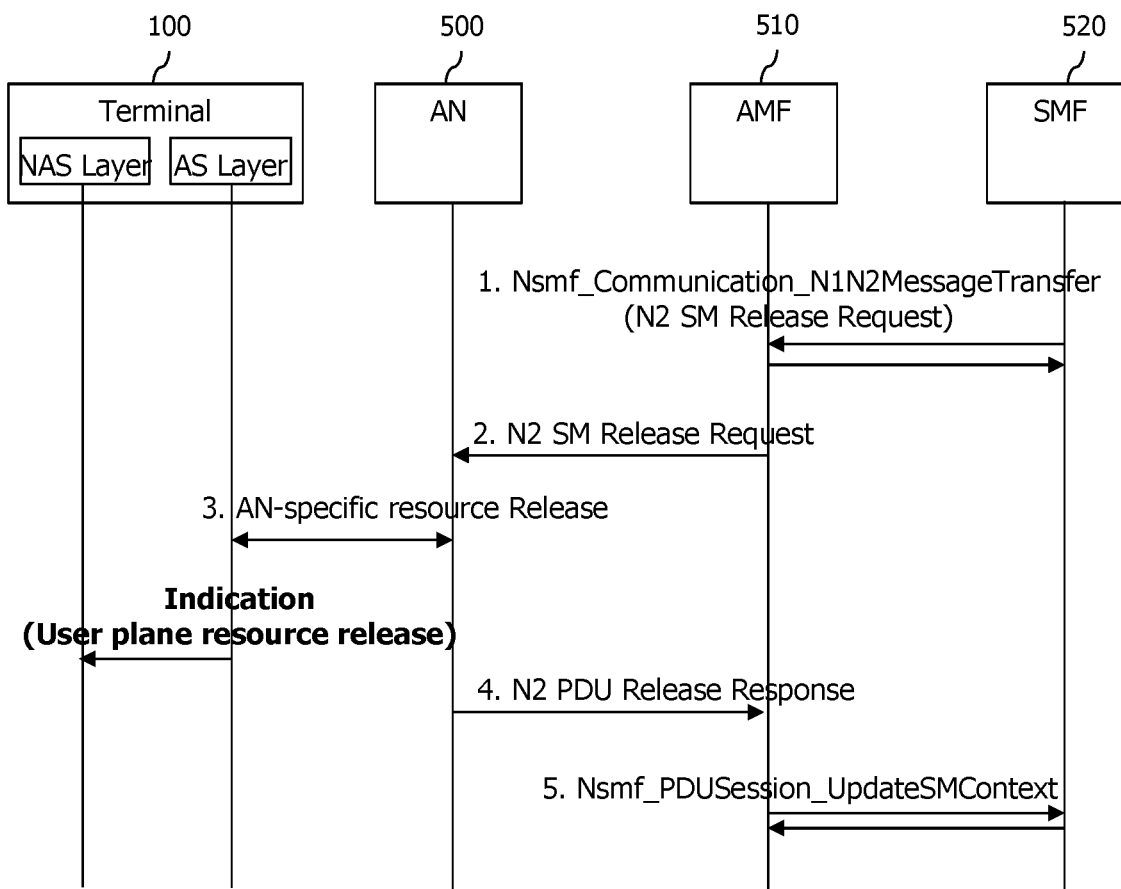
FIG. 12 shows an example of a procedure for deactivating a PDU session according to a first technique of a second implementation of the present disclosure.

FIG. 12 shows an example of a procedure for deactivating a PDU session according to a first technique of a second implementation of the present disclosure.

In the example of FIG. 12, interaction is performed between an AS layer and NAS layer of a terminal, as a CN-initiated PDU session deactivation procedure.

1) The SMF 520 transmits the N2 SM release request message to the AN 500 through an Namf_Communication_N1N2MessageTranfer service in order to release a radio resource in the AN 500.

2) The AMF 510 transmits to the AN 500 the N2 SM release request message received from the SMF 520.

3) Then, the AN 500 releases an AN resource.

In this process, the AS layer of the terminal 100 transmits to the NAS layer the indication/information indicating that a user plane resource is released. The NAS layer of the terminal 100 recognizes that the PDU session is deactivated, through the indication/information.

4) The AN 500 transmits an N2 SM release response message to the AMF 510 after the AN resource is released.

5) The AMF 510 may transmit an N2 SM release response message to the SMF 520 by using an Nsmf_PDUSession_UpdateSMContext service II-2. Second Technique of Second Implementation According to a second technique of a second implementation, the SMF 520 may allow the terminal to implicitly release the PDU session. That is, the SMF 520 may release the PDU session, without having to transmit to the terminal 100 a message for releasing the PDU session. However, while transmitting an N2 release request message to the AMF 510, the SMF 520 may report whether a corresponding request is for deactivating or releasing the PDU session. Then, the AMF 510 transfers this to the AN 500. Then, a base station of the AN 500 transmits RRC signaling (e.g., an RRC connection reconfiguration message) to the terminal 100 while releasing a radio resource for the PDU session, and thus reports whether the PDU session is to be released or deactivated. Then, while transferring to the NAS layer the indication/information indicating that the radio resource is released, the AS layer of the terminal 100 may report whether it is the PDU session release or the PDU session deactivation. Alternatively, this may be reported only in case of the PDU session deactivation or in case of the PDU session release.

Figure 13:
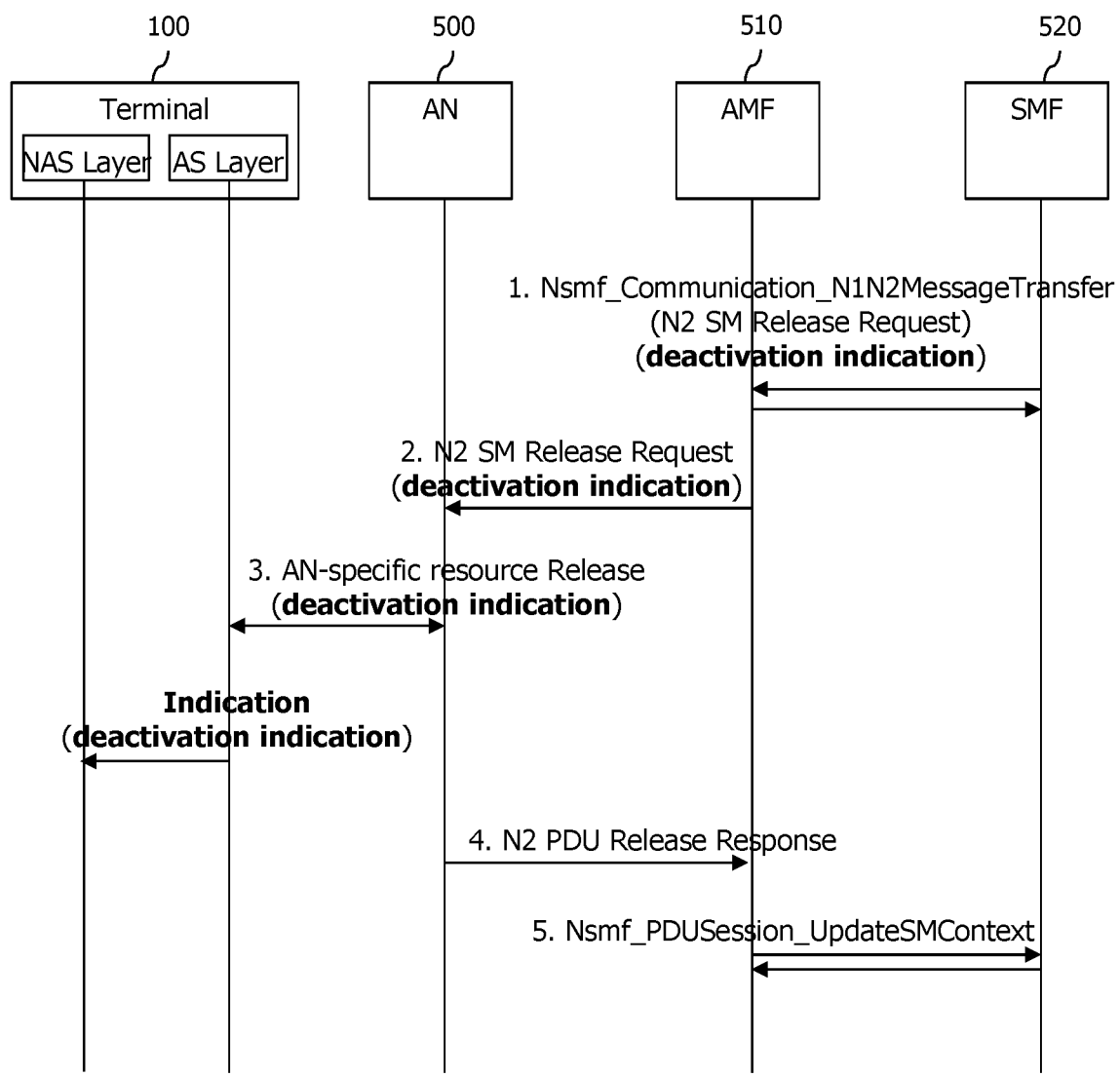
FIG. 13 shows an example of a procedure in which an SMF deactivates a PDU session according to a second technique of a second implementation of the present disclosure.

FIG. 13 shows an example of a procedure in which an SMF deactivates a PDU session according to a second technique of a second implementation of the present disclosure.

In the example of FIG. 13, interaction is performed between an AS layer and NAS layer of a terminal, and an indication indicating release/deactivation is transferred, as a CN-initiated PDU session deactivation procedure.

1) The SMF 520 transmits an N2 SM release request message to the AN 500 in order to release a radio resource in the AN 500. The SMF 520 may additionally transmit an indication/information indicating deactivation in the message. Therefore, the AN 500 knows that a corresponding request is deactivated.

2) The AMF 510 transfers the N2 SM release request message, received from the SMF 520, to the AN 500 through an Namf_Communication_N1N2MessageTranfer service.

3) The AN 500 releases an AN resource. In this process, in order to inform that a corresponding PDU session is deactivated, the AN 500 transmits AN signaling to the AS layer of the terminal 100. Then, the AS layer of the terminal 100 transmits indication/information indicating that the PDU session is deactivated to the NAS layer.

4) The AN 500 transmits an N2 SM release response message to the AMF 510 after the AN resource is released.

5) The AMF 510 may transmit the N2 SM release response message to the SMF 520 by using an Nsmf_PDUSession_UpdateSMContext service III. Third Implementation: Technique of Using a Combination of the First Implementation and the Second Implementation According to a specific procedure, the technique of the first implementation, the first technique of the second implementation, and the second technique of the second implementation may be used in combination. For example, if the SMF 520 deactivates a PDU session, according to the second implementation, the AS layer of the terminal 100 may transfer to the NAS layer the indication/information indicating that the PDU session is deactivated. In addition, since PDU session status information is included in a PDU session establishment accept message, the NAS layer of the terminal 100 may be allowed to directly determine whether the PDU session is deactivated or activated.

When the above techniques are used in combination, instead of transmitting the direct indication/information or PDU session status, an additional cause value may be defined to indirectly report a deactivated/activated status or a PDU session status.

Meanwhile, although it is described above that the NAS layer of the terminal 100 knows the PDU session status, in actual implementation, another function/layer may know and manage a corresponding status, instead of the NAS layer.

Figure 14:
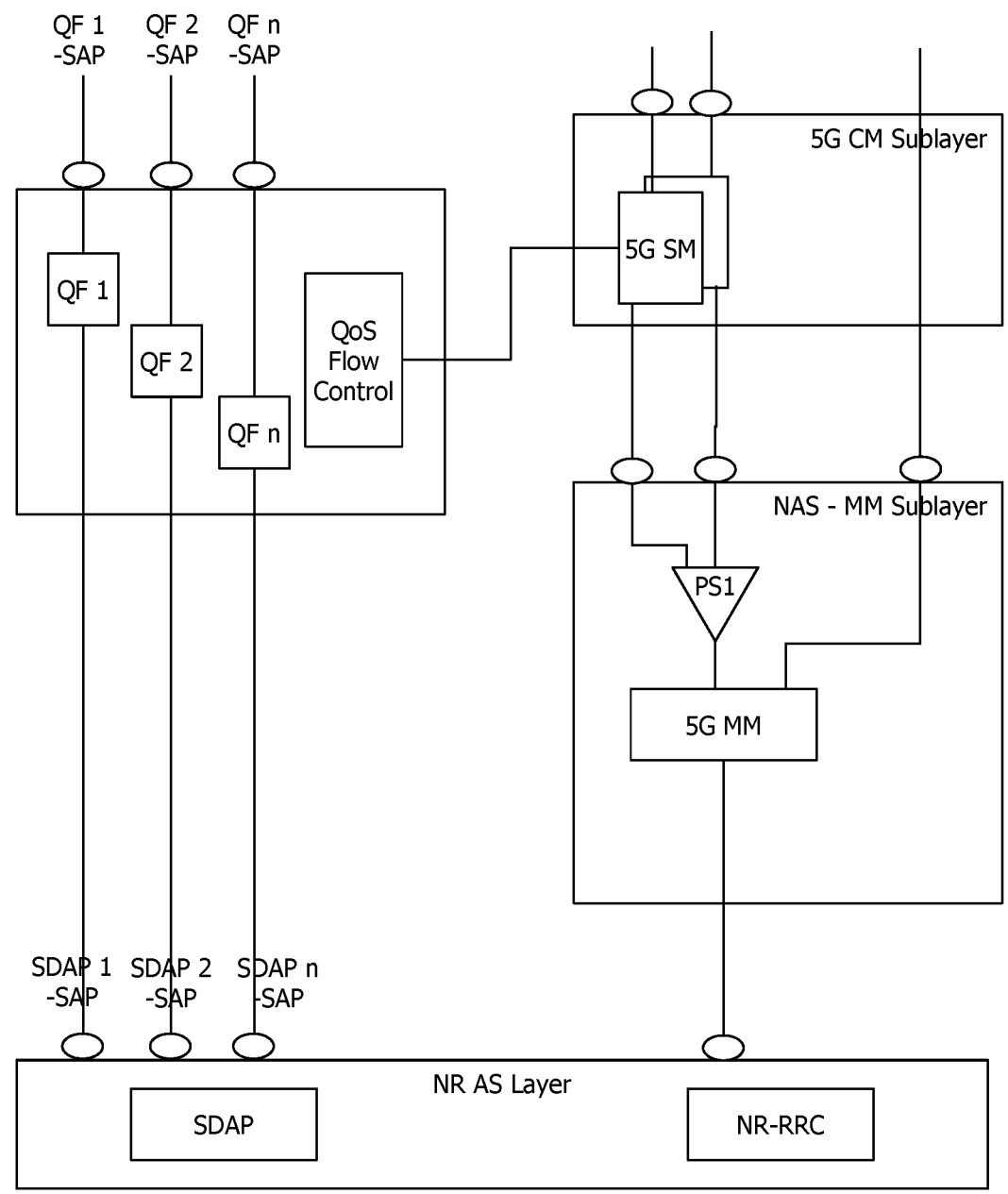
FIG. 14 shows an example of a protocol stack implemented in a terminal.

FIG. 14 shows an example of a protocol stack implemented in a terminal.

If a protocol stack is configured inside a terminal as shown in FIG. 14, an entity for storing and managing PDU session activation/deactivation may be a QoS flow control entity. In this case, an AS layer may transmit an indication indicating a user plane resource release/establishment to the QoS flow control entity. In addition, a 5 GSM layer may transfer PDU session status information of a NAS layer to the QoS flow control entity. In this case, if data arrives from an upper layer, the QoS flow control entity may request the 5 GMM layer to set up a user plane when a corresponding PDU session is deactivated. Then, according to such a request, the 5 GMM layer may perform a user plane setup procedure through a service request message transmission procedure/registration procedure.

When the terminal recognizes a case where the PDU session is deactivated by using the above techniques, the terminal may transmit data after changing the PDU session to an activated status, by transmitting a registration request message or a service request message before sending data to the PDU session.

IV. Brief Summary of Implementations of the Present Disclosure

Implementations of the present disclosure are summarized as follows with reference to the accompanying drawings.

Figure 15:
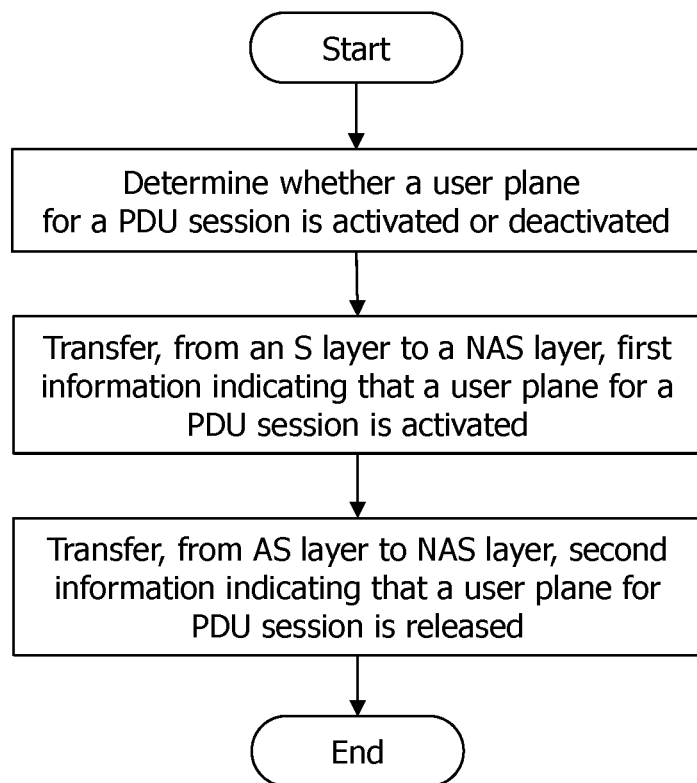
FIG. 15 is a flowchart showing an example of an implementation of the present disclosure.

FIG. 15 is a flowchart showing an example of an implementation of the present disclosure.

Referring to FIG. 15, an AS layer of a terminal determines whether a user plane for a PDU session is activated or released.

The AS layer may transfer, to a NAS layer, first information indicating that the user plane for the PDU session is activated, based on that the user plane for the PDU session is activated.

In addition, the AS layer may transfer, to the NAS layer, second information indicating that the user plane for the PDU session is released, based on that the user plane for the PDU session is released.

The NAS layer may store a deactivated status of the PDU session.

Although not shown, the NAS layer may transmit a first NAS message related to the PDU session. In addition, the NAS layer may receive a second NAS message related to the PDU session.

The first NAS message may include a PDU session establishment request message. In addition, the second NAS message may include a PDU session establishment accept message or a PDU session establishment reject message.

The NAS layer may determine that that the PDU session is in a deactivated status, based on that the second information is received from the AS layer but a PDU session release message is not received from a network.

The NAS layer may determine that the PDU session is not deactivated but released, based on that the second information is received from the AS layer but the PDU session release message is received from the network.

The NAS layer may determine that the PDU session is in a deactivated status, based on that a PDU session establishment accept message is received but the first information is not received from the AS layer.

V. Example of Utilizing Implementations of the Present Disclosure

An example according to an implementation of the present disclosure can be utilized will be described as follows.

<General Description on Device to which Implementations of the Present Disclosure is Applicable>

Hereinafter, a device to which implementations of the present disclosure is applicable will be described.

Figure 16:
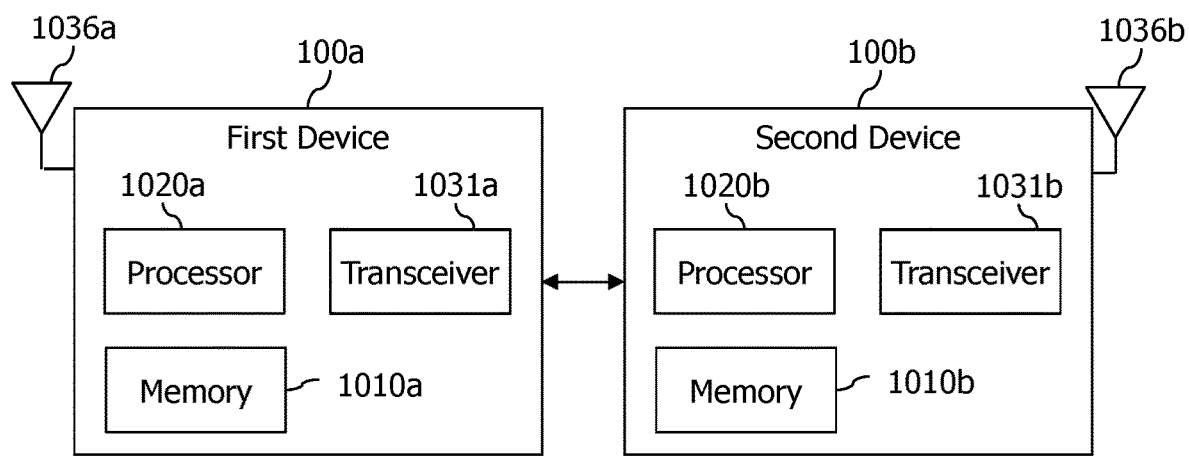
FIG. 16 shows an example of a wireless communication system according to an implementation of the present disclosure.

FIG. 16 shows an example of a wireless communication system according to an implementation of the present disclosure.

Referring to FIG. 16, a wireless communication system may include a first device 100a and a second device 100b.

The first device 100a may be a base station, a network node, a transmitting terminal, a receiving terminal, a wireless device, a wireless communication device, a vehicle, a vehicle equipped with self-driving capability, a connected car, a drone (or an unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a climate/environment device, a device related to a 5G service, or a device related to a field of the 4th industrial revolution.

The second device 100b may be a base station, a network node, a transmitting terminal, a receiving terminal, a wireless device, a wireless communication device, a vehicle, a vehicle equipped with self-driving capability, a connected car, a drone (or an unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a climate/environment device, a device related to a 5G service, or a device related to a field of the 4th industrial revolution.

For example, a terminal may include a mobile phone, a smart phone, a laptop computer, a digital broadcasting terminal, a personal digital assistants (PDA), a portable multimedia player (PMP), a navigation, a slate PC, a table PC, an ultrabook, a wearable device (e.g., a smartwatch, a smart glass, a head mounted display (HMD)), or the like. For example, the HMD may be a display device worn on a head. For example, the HMD may be used to implement VR, AR, or MR.

For example, the drone may be an unmanned aerial vehicle which flies by using a radio control signal. For example, the VR device may include a device for realizing an object, background, or the like of a virtual world. For example, the AR device may include a device for realizing an object or background of a virtual world by connecting with an object or background or the like of a real world. For example, the MR device may include a device for realizing an object or background of a virtual world by merging an object, background, or the like of a real world. For example, the hologram device may include a device for recording and reproducing stereoscopic information to realize a 360-degree stereoscopic image, by utilizing light interference which occurs when two laser beams called holography are met. For example, the public safety device may include an image relay device or an image device or the like which can be worn on a user's body. For example, the MTC device and the IoT device may be devices not requiring direct human intervention or manipulation. For example, the MTC device and the IoT device may include a smart meter, a bending machine, a thermometer, a smart bulb, a door lock, or various sensors. For example, the medical device may be a device used for diagnosing, curing, alleviating, treating, or preventing a disease. For example, the medial device may be a device used for diagnosing, curing, alleviating or ameliorating an injury or disorder. For example, the medial device may be a device used for inspecting, replacing, or modifying a structure or function. For example, the medical device may be a device used for controlling pregnancy. For example, the medical device may include a diagnostic device, a surgical device, a (in vitro) diagnostic device, a hearing aid, or a treatment device. For example, the security device may be a device installed to prevent potential hazards and maintain security. For example, the security device may be a camera, a CCTV, a recorder, or a black box. For example, the Fin-Tech device may be a device capable of providing financial services such as mobile payment. For example, the Fin-tech device may include a payment device or a point of sales (POS). For example, the climate/environmental device may include a device for monitoring or predicting climates/environments.

The first device 100*a* may include at least one processor such as a processor 1020*a*, at least one memory such as a memory 1010*a*, and at least one transceiver such as a transceiver 1031*a*. The processor 1020*a* may perform the aforementioned functions, procedures, and/or methods. The processor 1020*a* may perform one or more protocols. For example, the processor 1020*a* may perform one or more layers of a radio interface protocol. The memory 1010*a* may be coupled to the processor 1020*a*, and may store various types of information and/or commands. The transceiver 1031*a* may be coupled to the processor 1020*a*, and may be controlled to transmit/receive a radio signal.

The second device 100*b* may include at least one processor such as a processor 1020*b*, at least one memory such as a memory 1010*b*, and at least one transceiver such as a transceiver 1031*b*. The processor 1020*b* may perform the aforementioned functions, procedures, and/or methods. The processor 1020*b* may perform one or more protocols. For example, the processor 1020*b* may perform one or more layers of a radio interface protocol. The memory 1010*b* may be coupled to the processor 1020*b*, and may store various types of information and/or commands. The transceiver 1031*b* may be coupled to the processor 1020*b*, and may be controlled to transmit/receive a radio signal.

The memory 1010*a* and/or the memory 1010*b* may be connected internally or externally to the processor 1020*a* and/or the processor 1020*b*, respectively, or may be connected to other processors through various techniques such as wired or wireless connections.

The first device 100*a* and/or the second device 100*b* may have one or more antennas. For example, an antenna 1036*a* and/or an antenna 1036*b* may be configured to transmit/receive a radio signal.

Figure 17:
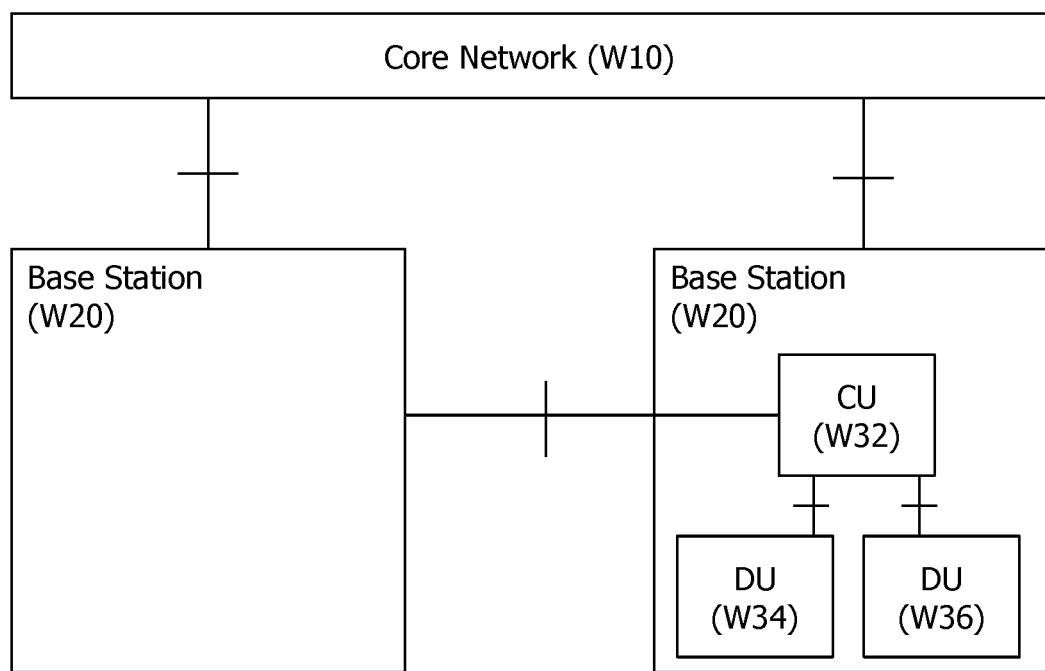
FIG. 17 is a block diagram showing an example of a network node according to an implementation of the present disclosure.

FIG. 17 is a block diagram of an example of a network node according to an implementation of the present disclosure.

In particular, FIG. 17 shows an example of the network node of FIG. 10 in greater detail, when a base station is divided into a central unit (CU) and a distributed unit (DU).

Referring to FIG. 17, base stations W20 and W30 may be connected to a core network W10, and the base station W30 may be connected to the neighboring base station W20. For example, an interface between the base stations W20 and W30 and the core network W10 may be referred to as NG, and an interface between the base station W30 and the neighboring base station W20 may be referred to as Xn.

The base station W30 may be divided into a CU W32 and DUs W34 and W36. That is, the base station W30 may be managed by being separated in a layered manner. The CU W32 may be connected to one or more DUs W34 and W36. For example, an interface between the CU W32 and the DUs W34 and W36 may be referred to as F1. The CU W32 may perform a function of higher layers of the base station, and the DUs W34 and W36 may perform a function of lower layers of the base station. For example, the CU W32 may be a logical node for hosting radio resource control (RRC), service data adaptation protocol (SDAP), and packet data convergence protocol (PDCP) layers of the base station (e.g., gNB), and the DUs W34 and W36 may be a logical node for hosting radio link control (RLC), media access control (MAC), and physical (PHY) layers of the base station. Alternatively, the CU W32 may be a logical node for hosting RRC and PDCP layers of the base station (e.g., en-gNB).

Operations of the DUs W34 and W36 may be partially controlled by the CU W32. One DU W34 or W36 may support one or more cells. One cell may be supported only by one DU W34 or W36. One DU W34 or W36 may be connected to one CU W32, and one DU W34 or W36 may be connected to a plurality of CUs by proper implementation.

Figure 18:
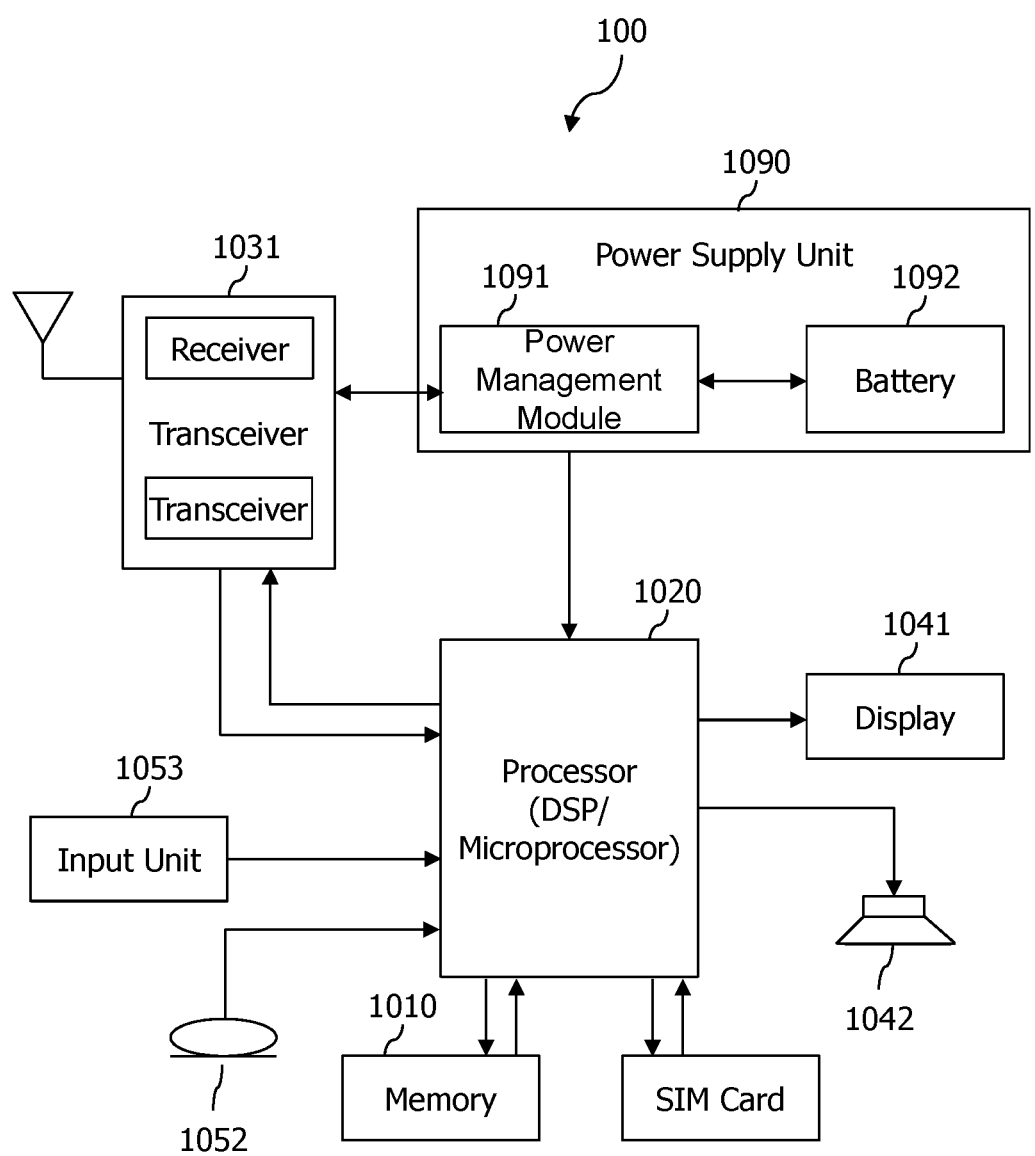
FIG. 18 is a block diagram showing an example of a structure of a terminal according to an implementation of the present disclosure.

FIG. 18 is a block diagram showing an example of a structure of a terminal according to an implementation of the present disclosure.

In particular, FIG. 18 shows an example of the terminal of FIG. 16 in greater detail.

A terminal includes a memory 1010, a processor 1020, a transceiver 1031, a power management module 1091, a battery 1092, a display 1041, an input unit 1053, a speaker 1042, a microphone 1052, a subscriber identification module (SIM) card, and one or more antennas.

The processor 1020 may be configured to implement the disclosed functions, procedures, and/or methods described in the present disclosure. Layers of a radio interface protocol may be implemented in the processor 1020. The processor 1020 may include application-specific integrated circuits (ASICs), other chipsets, logic circuits, and/or data processing units. The processor 1020 may be an application processor (AP). The processor 1020 may include at least one of a digital signal processor (DSP), a central processing unit (CPU), a graphics processing unit (GPS), and a modulator and demodulator (modem). An example of the processor 1020 may include an SNAPDRAGON™ series processor manufactured by Qualcomm®, an EXYNOSTM series processor manufactured by Samsung®, an A series processor manufactured by Apple®, a HELIOTM series processor manufactured by MediaTek®, an ATOM™ series processor manufactured by INTEL®, or a corresponding next-generation processor.

The power management module 1091 manages power for the processor 1020 and/or the transceiver 1031. The battery 1092 supplies power to the power management module 1091. The display 1041 outputs a result processed by the processor 1020. The input unit 1053 receives an input to be used by the processor 1020. The input unit 1053 may be displayed on the display 1041. The SIM card is an integrated circuit used to safely store an international mobile subscriber identity (IMSI) used to identify and authenticate a subscriber and a key related thereto in a portable phone and a portable phone device such as a computer. Contacts information may be stored in many SIM cards.

The memory 1010 is operatively coupled to the processor 1020, and stores a variety of information for operating the processor 1020. The memory 1010 may include a read-only memory (ROM), a random access memory (RAM), a flash memory, a memory card, a storage medium, and/or other equivalent storage devices. When implemented in software, the techniques explained in the present disclosure can be implemented with a module (e.g., procedure, function, etc.) for performing the functions explained in the present disclosure. The module may be stored in the memory 1010 and may be performed by the processor 1020. The memory 1010 may be implemented inside the processor 1020. Alternatively, the memory 1010 may be implemented outside the processor 1020, and may be coupled to the processor 1020 in a communicable manner by using various techniques.

The transceiver 1031 is operatively coupled to the processor 1020, and transmits and/or receives a radio signal. The transceiver 1031 includes a transmitter and a receiver. The transceiver 1031 may include a baseband signal for processing a radio frequency signal. The transceiver controls one or more antennas to transmit and/or receive a radio signal. In order to initiate communication, the processor 1020 transfers command information to the transceiver

1031, for example, to transmit a radio signal constituting voice communication data. The antenna serves to transmit and receive a radio signal. When the radio signal is received, the transceiver 1031 may transfer a signal to be processed by the processor 1020, and may convert the signal into a baseband signal. The processed signal may be converted into audible or readable information which is output through the speaker 1042.

The speaker 1042 outputs a result related to a sound processed by the processor 1020. The microphone 1052 receives a sound-related input to be used by the processor 1020.

A user presses (or touches) a button of the input unit 1053 or drives voice (activates voice) by using the microphone 1052 to input command information such as a phone number or the like. The processor 1020 receives the command information, and performs a proper function such as calling the phone number or the like. Operational data may be extracted from the SIM card or the memory 1010. In addition, the processor 1020 may display command information or operational information on the display 1041 for user's recognition and convenience.

VI. Scenario to which Implementations of the Present Disclosure is Applicable Hereinafter, a scenario to which the aforementioned implementations of the present disclosure are applicable will be described.

In the present disclosure, an always-on PDU session for URLLC having a low latency characteristic may be used for artificial intelligence, robots, autonomous driving, extended reality, etc., in the 5G scenario described below.

<5G Usage Scenario>

Figure 19:
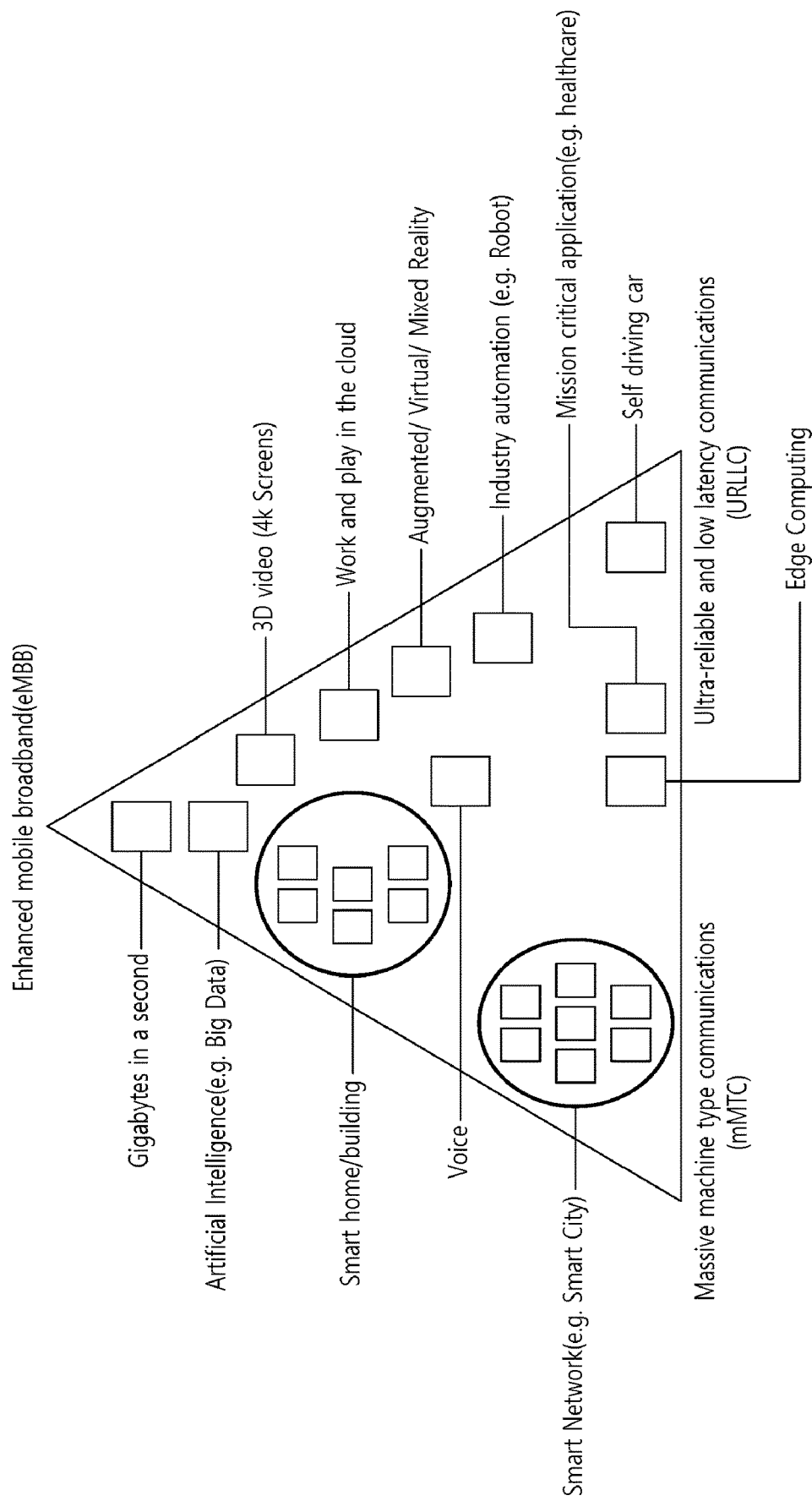
FIG. 19 shows an example of a 5G usage scenario.

FIG. 19 shows an example of a 5G usage scenario.

The 5G usage scenario of FIG. 19 is for exemplary purposes only, and thus technical features of implementations of the present disclosure are also applicable to other 5G usage scenarios not shown in FIG. 19.

Referring to FIG. 19, three main requirement areas of 5G includes: (1) an enhanced mobile broadband (eMBB) area; (2) a massive machine type communication (mMTC) area; and (3) an ultra-reliable and low latency communications (URLLC) area. In some usage examples, a plurality of areas may be required for optimization. In other usage examples, only one key performance indicator (KPI) may be focused. The 5G supports these various usage examples in a flexible and reliable manner.

The eMBB focuses on overall improvement of a data rate, latency, user density, mobile broadband access capacity, and coverage. The eMBB aims at a throughput of about 10 Gbps. The eMBB allows to surpass basic mobile Internet access, and covers sufficient interactive tasks, media in a cloud or augmented reality, and entertainment application. Data is one of the core engine for 5G, and it seems that a dedicated voice service can be seen for the first time in the 5G era. In the 5G, it is expected that voice will be simply processed with an application program by using a data connection provided by a communication system. A main reason of an increased traffic amount is an increase in a content size and an increase in the number of applications requiring a high data transfer rate. A streaming service (audio and video), interactive video, and mobile Internet connectivity will be more widely used as more devices are connected to the Internet. These many applications require always-on connectivity to push real-time information and notifications to a user. There is a rapid increase in cloud storage and applications in a mobile communication platform, which is applicable to both work and entertainment. The cloud storage is a special example of driving an increase in an uplink data transfer rate. The 5G is also used for a remote task on the cloud, and requires much lower end-to-end latency to maintain excellent user experience when a tactile interface is used. Taking entertainment for example, cloud games and video streaming are another key element requiring improvement in mobile broadband capability. The entertainment is essential in a smartphone and a tablet anywhere, including a high mobility environment such as a train, a car, and an airplane. Another usage example is augmented reality and information retrieval for entertainment. Herein, the augmented reality requires very low latency and an instantaneous data amount.

The mMTC is designed to enable communication between a plenty of low-cost devices driven by batteries and is intended to support an application such as smart metering, logistics, and field and body sensors. The mMTC aims at about 10-year-lifespan batteries and/or about million devices per square kilometer (1 km2). The mMTC may configure a sensor network by seamlessly connecting an embedded sensor in all sectors, and is one of the most expected 5G usage examples. Potentially, it is predicted that the number of IoT devices will reach 20.4 billion by 2020. A smart network utilizing industrial IoT is one of areas where the 5G performs a key role in enabling smart cities, asset tracking, smart utilities, agriculture, and security infrastructures.

The URLLC allows a device and a machine to communicate with very high reliability, very low latency, and high availability, and thus is identical to communication and control between self-driving vehicles, industrial control, factory automation, mission-critical applications such as remote operations and healthcare, smart grids, and public safety applications. The URLLC aims at a latency of about 1 ms. The URLLC includes a new service which will change the industry through a link with high-reliability/ultra-low latency such as remote control and self-driving vehicles. A level of reliability and latency is essential for smart grid control, industrial automation, robotics, and drone control and adjustment.

Next, a plurality of usage examples included in the triangle of FIG. 13 will be described in greater detail.

In 5G, fiber-to-the-home (FTTH) and cable-based broadband (or DOCSIS) may be compensated as a means of providing a stream rated in the range from hundreds of megabits per second to gigabits per second. This fast speed may be required not only in virtual reality (VR) and augmented reality (AR) but also in transferring TV broadcasting in the resolution of at least 4 K (6K, 8K, or higher). VR and AR applications include almost immersive sports events. A specific application may require a special network configuration. For example, in case of the VR game, a game company may have to integrate a core server with an edge network server of an operator in order to minimize latency.

Automotive is expected to become an important new engine for 5G, together with many usages for mobile communications for vehicles. For example, entertainment for a passenger demands high capacity and high mobile broadband at the same time. This is because future users will continue to expect high-quality connectivity regardless of their locations and speeds. Another usage example of the automotive sector is an augmented reality dashboard. Through the augmented reality dashboard, a driver is able to identify an object, in the dark, shown above that the driver is seeing through a windshield. The augmented reality dashboard displays information to be reported to the deriver as to a distance and movement of an object in an overlapping manner. In the future, a radio module will enable communication between vehicles, information exchange between a vehicle and a supported infrastructure, and information exchange between an automotive and another connected device (e.g., a device carried by a pedestrian). The safety system guides an alternative course of action so that the driver can drive more safely, thereby decreasing a risk of accidents. A next step will be a remote control vehicle or a self-driving vehicle. This requires very reliable and very fast communication between different self-driving vehicles and/or between an automotive and an infrastructure. In the future, the self-driving vehicle will perform all driving activities, and the driver will focus only on erroneous traffic which cannot be identified by the vehicle itself. A technical requirement of the self-driving vehicle is ultra-low latency and ultra-high reliability so that traffic safety is increased to a level that cannot be achieved by humans.

A smart city and a smart home, referred to as a smart society, will be embedded in a high-density wireless sensor network as an example of a smart network. A distributed network of an intelligent sensor will identify a condition for cost and energy-efficient maintenance of a city or home. A similar configuration may be performed for each household. A temperature sensor, a window and heating controller, a burglar alarm, and home appliance are all wirelessly connected. Many of these sensors typically require a low data rate, low power, and low cost. For example, however, real-time HD video may be required in a specific-type device for surveillance.

Since consumption and distribution of energy, including heat or gas, are highly dispersed, automated control of a distributed sensor network is required. The smart grid interconnects these sensors by using digital information and communication techniques to collect information and act according to the information. This information may include acts of suppliers and consumers, allowing the smart grid to improve distribution of fuels such as electricity in an efficient, reliable, production sustainable, and automated manner. The smart grid may be regarded as another sensor network with low latency.

The health sector has many applications which can benefit from mobile communication. A communication system may support telemedicine which provides a clinical care in remote locations. This may help to reduce a barrier for a distance, and may improve access to a medical service which cannot be persistently used in a far rural area. This is also used to save lives in a critical care and an emergency situation. A wireless sensor network based on mobile communication may provide remote monitoring and sensors for parameters such as heart rates and blood pressure.

Wireless and mobile communications are becoming gradually important in an industrial application sector. Wiring is expensive in terms of installation and maintenance cost. Therefore, a possibility of replacing a cable with a wireless link that can be reconfigured is an attractive opportunity in many industrial sectors. However, to achieve this, wireless connectivity is required to operate with latency, reliability, and capacity similar to those of a cable, and to be managed in a simplified manner. Low latency and very low error probability are new requirements, which requires 5G connectivity.

Logistics and cargo tracking are an important usage example for mobile communication which enables inventory and package tracking anywhere by using a location-based information system. An example of using logistics and cargo tracking typically requires a low data rate, but requires wide range and reliable location information.

<Artificial Intelligence (AI)>

Artificial intelligence refers to a sector that studies artificial intelligence and a methodology for creating it. Machine learning refers to a sector that defines various problems dealt in an artificial intelligent sector and studies a methodology for solving the problems. The machine learning is also defined as an algorithm that improves performance of a task through a steady experience for a certain task.

An artificial neural network (ANN) is a model used in machine learning, and may refer to an overall model having problem-solving ability and consisting of artificial neurons (nodes) constructing a network by combining synapses. The ANN may be defined by a connectivity pattern between neurons of different layers, a leaning processor for updating a model parameter, and an activation unction for generating an output value.

<Robot>

A robot may mean a machine which automatically operates or processes a given task according to its own capability. In particular, a robot having a function of performing an operation by recognizing an environment and by autonomously making a decision may be referred to as an intelligent robot.

The robot may be classified for industrial, medical, household, and military purposes depending on the purpose or field of use.

The robot may include a driving unit having an actuator or a motor to perform various physical operations such as moving a robot joint. In addition, a movable robot may include a wheel, a brake, a propeller, and the like in the driving unit, thereby being able to driving on the ground or flying in the air through the driving unit.

<Self-Driving (Autonomous-Driving)>

Self-driving means an autonomous-driving technique, and a self-driving vehicle means a vehicle that travels without user's manipulation or with minimum user' manipulation.

For example, the self-driving may include all of a technique for maintaining a lane while driving, a technique for automatically controlling speed such as adaptive cruise control, a technique for automatically travelling along a predetermined route, and a technique for travelling by automatically setting a route when a destination is determined.

The vehicle may include all of a vehicle having only an internal combustion engine, a hybrid vehicle having an internal combustion engine and an electric motor together, and an electric vehicle having only an electric motor, and may include not only an automotive vehicle but also a train, a motorcycle, etc.

In this case, the self-driving vehicle may be regarded as a robot having an autonomous-driving function.

<eXtended Reality (XR)>

Extended reality collectively refers to virtual reality (VR), augmented reality (AR), and mixed reality (MR). A VR technique is a computer graphic technique providing real-world objects and backgrounds only as CG images. An AR technique a computer graphic technique providing virtual CG images together on real object images. An MR technique is a computer graphic technique providing virtual objects in the real world in a mixed and combined manner.

The MR technique is similar to the AR technology in a sense that a real object and a virtual object are shown together. However, the AR technology in which the virtual object is used as a complement to the real object differs from the MR technology in which the virtual object and the real object are used in an equal manner.

The XR technique may be applied to a head-mount display (HMD), a head-up display (HUD), a mobile phone, a tablet PC, a laptop, a desktop, TV, a digital signage, etc., and a device to which the XR technique is applied may be referred to as an XR device.

Figure 20:
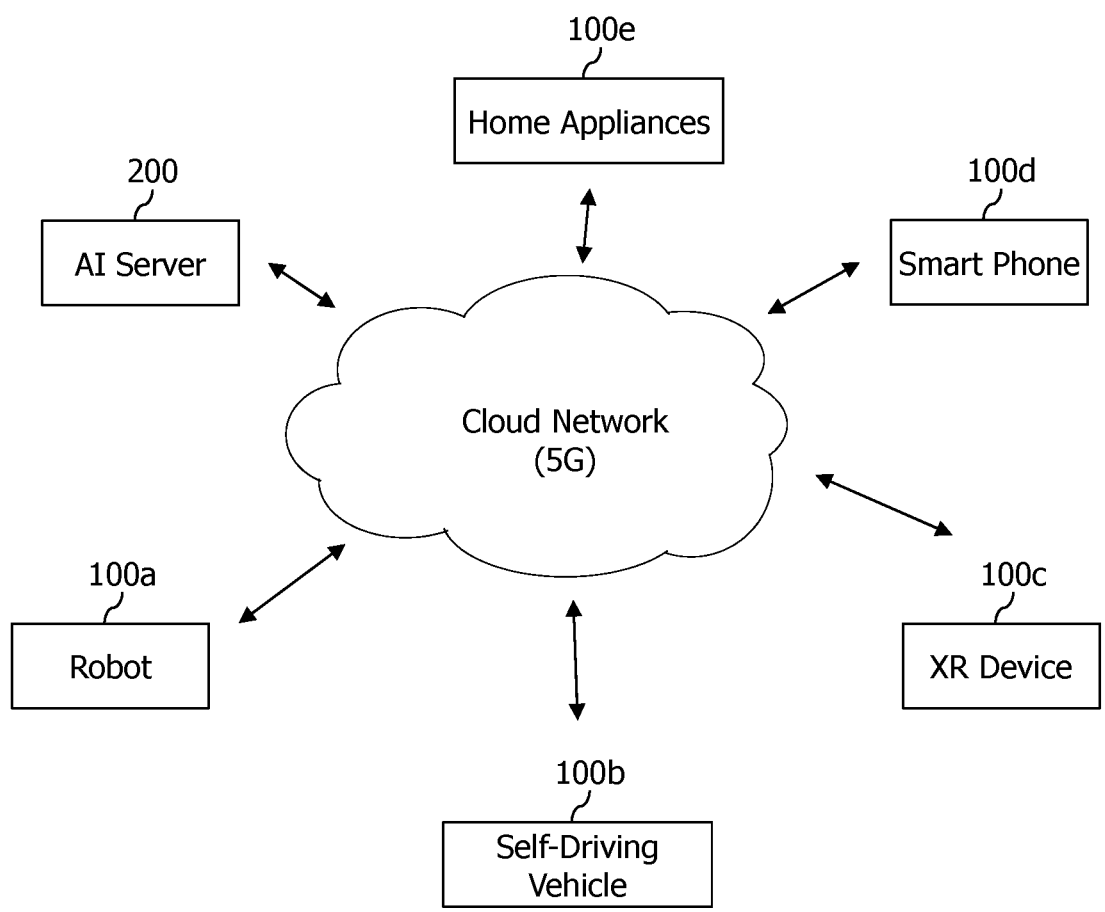
FIG. 20 shows an example of an artificial intelligence (AI) system according to an implementation of the present disclosure.

FIG. 20 shows an example of an AI system according to an implementation of the present disclosure.

Referring to FIG. 20, in the AI system 1, at least one of an AI server 200, a robot 100a, a self-driving vehicle 100b, an XR device 100c, a smart phone 100d, and a home appliance 100e is connected to a cloud network 10. Herein, the robot 100a, self-driving vehicle 100b, XR device 100c, smart phone 100d, or home appliance 100e to which the AI technique is applied may be referred to as AI devices 100a to 100e.

The cloud network 10 may mean a network which constructs part of a cloud computing infrastructure or which exists in the cloud computing infrastructure. Herein, the cloud network 10 may be configured by using a 3G network, a 4G or long term evolution (LTE) network, or a 5G network.

That is, each of the devices 100a to 100e and 200 constituting the AI system 1 may be connected to each other through the cloud network 10. In particular, the devices 100a to 100e and 200 may communicate with each other via a base station, but may communicate with each other directly without having to use the base station.

The AI server 200 may include a server which performs AI processing and a server which performs an operation for big data.

The AI server 200 may be connected to at least one of the AI devices constituting the AI system 1, that is, the robot 100a, the self-driving vehicle 100b, the XR device 100c, the smart phone 100d, and the home appliance 100e through the cloud network 10, and may assist at least part of AI processing of the connected AI devices 100a to 100e.

In this case, the AI server 200 may serve to learn an artificial neural network according to a machine learning algorithm on behalf of the AI devices 100a to 100e, and may directly store a learning model or transmit it to the AI devices 100a to 100e.

In this case, the AI server 200 may receive input data from the AI devices 100a to 100e, infer a result value for the input data received using the learning module, and generate a control command or a response based on the inferred result value to transmit it to the AI devices 100a to 100e.

Alternatively, the AI devices 100a to 100e may infer the result value for the input data by using a direct learning model and generate a control command and a response based on the inferred result value.

Hereinafter, various implementations of the AI devices 100a to 100e to which the aforementioned techniques are applied will be described.

<AI+Robot>

The robot 100a may be implemented as a guide robot, a carrying robot, a cleaning robot, a wearable robot, an entertainment robot, a pet robot, an unmanned flying robot, etc., by applying the AI technique.

The robot 100a may include a robot control module for controlling an operation, and the robot control module may mean a software module or a chip implementing the software module as hardware.

The robot 100a may use sensor information acquired from various types of sensors to obtain status information of the robot 100a, to detect (recognize) a surrounding environment and an object, to generate map data, to determine a travel route and a driving plan, to determine a response for user interaction, or to determine an operation.

Herein, the robot 100a may use the sensor information acquired from at least one sensor among a lidar, a radar, and camera to determine a travel path and a driving plan.

The robot 100a may use a leaning model consisting of at least one artificial neural network to perform the aforementioned operations. For example, the robot 100a may use the leaning model to recognize a surrounding environment and an object, and may use the recognized surrounding environment information or object information to determine an operation. Herein, the leaning model may be learned directly from the robot 100a or learned from an external device such as the AI server 200 or the like.

In this case, the robot 100a may generate a result and perform an operation by directly using the learning model. However, it is also possible to perform an operation by transmitting sensor information to the external device such as the AI server 200 or the like and by receiving a result generated based thereon.

The robot 100a may determine the travel path and the driving plan by using at least one of map date, object information detected from sensor information, and object information acquired from an external device, and may control a driving unit so that the robot 100a travels according to the determined travel path and driving plan.

The map data may include object identification information on various objects arranged in a space in which the robot 100a moves. For example, the map data may include object identification information on stationary objects such as walls, doors, or the like and movable objects such as flowerpots, desks, or the like. In addition, the object identification information may include a name, a type, a distance, a location, or the like.

In addition, the robot 100a may control the driving unit on the basis of a user's control/interaction to travel or perform an operation. In this case, the robot 100a may acquire the intention information of an interaction based on a user's action or voice utterance, and may determine a response based on the acquired intention information to perform an operation.

<Combinations of AI, Robot, Autonomous-Driving, and XR>

The self-driving vehicle 100b may be implemented as a mobile robot, a vehicle, an unmanned aerial vehicle, or the like, by applying an AI technology.

The XR device 100c may be implemented as a Head-Mount Display (HMD), a Head-Up Display (HUD) equipped in a vehicle, a television, a mobile phone, a smart phone, a computer, a wearable device, a home appliance, a digital signage, a vehicle, a stationary robot, a mobile robot, or the like, by applying the AI technology.

The robot 100a may be implemented as a guide robot, a carrying robot, a cleaning robot, a wearable robot, an entertainment robot, a pet robot, an unmanned flying robot, or the like, by applying the AI technology and an autonomous-driving technology.

The robot 100a may be implemented as a guide robot, a carrying robot, a cleaning robot, a wearable robot, an entertainment robot, a pet robot, an unmanned aerial robot, a drone, or the like, by applying the AI technology and an XR technology.

The self-driving vehicle 100b may be implemented as a mobile robot, a vehicle, an unmanned aerial vehicle, or the like by applying the AI technology and the XR technology.

Although exemplary implementations of the present disclosure have been described above, the scope of the present disclosure is not limited to the specific implementations and the present disclosure may be modified, changed, or improved in various ways within the scope of the present disclosure and the category of the claims.

What is claimed is:

1. A method of handling a protocol data unit (PDU) session in a wireless communication system, the method performed by a wireless device implementing an access stratum (AS) layer and a non-access stratum (NAS) layer and comprising:
   detecting, by the AS layer of the wireless device, that a user plane for the PDU session is activated;
   transferring, by the AS layer and to the NAS layer of the wireless device, first information indicating that the user plane for the PDU session is activated;
   detecting, by the AS layer of the wireless device, that i) a user plane for the PDU session is released and ii) a PDU session release message is not received from a network; and
   transferring, by the AS layer and to the NAS layer of the wireless device, second information indicating that the user plane for the PDU session is released.

2. The method of claim 1, further comprising:
   transmitting, by the NAS layer of the wireless device, a first NAS message related to the PDU session; and
   receiving, by the NAS layer of the wireless device, a second NAS message related to the PDU session.

3. The method of claim 2,
   wherein the first NAS message comprises a PDU session establishment request message,
   wherein the second NAS message comprises a PDU session establishment accept message or a PDU session establishment reject message.

4. The method of claim 1, further comprising:
   determining that the PDU session is not deactivated and that the PDU session is released, based on (i) the NAS layer receiving the second information from the AS layer, and (ii) the NAS layer receiving a PDU session release message from a network.

5. The method of claim 1, further comprising:
   determining that the PDU session is in a deactivated status, based on (i) the NAS layer receiving a PDU session establishment accept message, and (ii) the NAS layer not receiving the first information from the AS layer.

6. The method of claim 1, further comprising:
   storing, by the NAS layer of the wireless device, the first information or the second information.

7. A wireless device configured to handle a protocol data unit (PDU) session in a wireless communication system, the wireless device configured to implement an access stratum (AS) layer and a non-access stratum (NAS) layer, and comprising:
   a transceiver;
   at least one processor; and
   at least one computer memory operably connectable to the at least one processor and storing instructions that, when executed by the at least one processor, perform operations comprising:
   detecting, by the AS layer of the wireless device, that a user plane for the PDU session is activated;
   transferring, by the AS layer and to the NAS layer of the wireless device, first information indicating that the user plane for the PDU session is activated;
   detecting, by the AS layer of the wireless device, that i) a user plane for the PDU session is released and ii) a PDU session release message is not received from a network; and
   transferring, by the AS layer and to the NAS layer of the wireless device, second information indicating that the user plane for the PDU session is released.

8. The wireless device of claim 7, wherein the operations further comprise:
   transmitting, by the NAS layer, a first NAS message related to the PDU session; and
   receiving, by the NAS layer, a second NAS message related to the PDU session.

9. The wireless device of claim 8,
   wherein the first NAS message comprises a PDU session establishment request message,
   wherein the second NAS message comprises a PDU session establishment accept message or a PDU session establishment reject message.

10. The wireless device of claim 7, wherein the operations further comprise:
    determining that the PDU session is not deactivated and that the PDU session is released, based on (i) the NAS layer receiving the second information from the AS layer, and (ii) the NAS layer receiving a PDU session release message from a network.

11. The wireless device of claim 7, wherein the operations further comprise:
    determining that the PDU session is in a deactivated status, based on (i) the NAS layer receiving a PDU session establishment accept message, and (ii) the NAS layer not receiving the first information from the AS layer.

12. The wireless device of claim 7, wherein the operations further comprise:
    storing, by the NAS layer of the wireless device, the first information or the second information.

13. A wireless device configured to handle a protocol data unit (PDU) session in a wireless communication system, the wireless device configured to implement an access stratum (AS) layer and a non-access stratum (NAS) layer, and comprising:
    a display;
    an input unit;
    a transceiver;
    at least one processor; and
    at least one computer memory operably connectable to the at least one processor and storing instructions that, when executed by the at least one processor, perform operations comprising:
    detecting, by the AS layer and to the NAS layer of the wireless device, that a user plane for the PDU session is activated;
    transferring, by the AS layer and to the NAS layer of the wireless device, first information indicating that the user plane for the PDU session is activated;
    detecting, by the AS layer and to the NAS layer of the wireless device, that a user plane for the PDU session is released; and
    transferring, by the AS layer and to the NAS layer of the wireless device, second information indicating that the user plane for the PDU session is released, based on non-reception of a PDU session release message from a network.

14. The wireless device of claim 13, wherein the operations further comprise:
  transmitting, by the NAS layer, a first NAS message related to the PDU session; and
  receiving, by the NAS layer, a second NAS message related to the PDU session.

15. The wireless device of claim 14,
  wherein the first NAS message comprises a PDU session establishment request message,
  wherein the second NAS message comprises a PDU session establishment accept message or a PDU session establishment reject message.

16. The wireless device of claim 13, wherein the operations further comprise:
  determining that the PDU session is not deactivated and that the PDU session is released, based on (i) the NAS layer receiving the second information from the AS layer, and (ii) the NAS layer receiving a PDU session release message from a network.

17. The wireless device of claim 13, wherein the operations further comprise:
  determining that the PDU session is in a deactivated status, based on (i) the NAS layer receiving a PDU session establishment accept message, and (ii) the NAS layer not receiving the first information from the AS layer.

* * * * *